United States Patent
Bajaj et al.

(10) Patent No.: US 11,665,013 B1
(45) Date of Patent: May 30, 2023

(54) OUTPUT DEVICE SELECTION

(71) Applicant: Amazon Technologies, Inc., Seattle, WA (US)

(72) Inventors: Jatin Bajaj, Santa Clara, CA (US); Clare Elizabeth Veladanda, Sunnyvale, CA (US); Tom Vessella, Seattle, WA (US); Gregg Taylor Lehman, Seattle, WA (US); Monty Eich, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/713,344

(22) Filed: Dec. 13, 2019

(51) Int. Cl.
*G06F 15/16* (2006.01)
*H04L 12/28* (2006.01)
*G10L 15/22* (2006.01)
*G10L 15/18* (2013.01)
*G10L 13/02* (2013.01)

(52) U.S. Cl.
CPC .......... *H04L 12/2805* (2013.01); *G10L 13/02* (2013.01); *G10L 15/1822* (2013.01); *G10L 15/22* (2013.01); *H04L 12/282* (2013.01); *H04L 12/283* (2013.01); *H04L 12/2838* (2013.01); *G10L 2015/223* (2013.01); *H04L 2012/2849* (2013.01)

(58) Field of Classification Search
CPC .............. H04L 12/2805; H04L 12/283; H04L 12/2838; H04L 12/282; H04L 2012/2849; G10L 15/1822; G10L 15/22; G10L 13/02; G10L 2015/223
See application file for complete search history.

(56) References Cited

U.S. PATENT DOCUMENTS

| | | | |
|---|---|---|---|
| 8,782,121 B1* | 7/2014 | Chang | H04L 67/104 709/202 |
| 8,818,844 B2* | 8/2014 | Dolph | G06Q 30/0208 705/14.35 |
| 10,025,447 B1* | 7/2018 | Dixit | G06F 3/011 |
| 10,096,237 B2* | 10/2018 | Lee | G08C 17/02 |
| 10,147,439 B1* | 12/2018 | Kristjansson | G01S 5/18 |
| 10,403,272 B1* | 9/2019 | Fanty | G10L 15/22 |
| 10,664,227 B1* | 5/2020 | Gorsica | G06F 3/165 |
| 10,978,062 B1* | 4/2021 | Vanderschaegen | H04N 21/42203 |
| 2007/0078552 A1* | 4/2007 | Rosenberg | H04W 52/027 700/94 |
| 2007/0112563 A1* | 5/2007 | Krantz | G10L 25/69 704/216 |
| 2009/0150697 A1* | 6/2009 | Yang | G06F 1/3287 713/323 |
| 2011/0162018 A1* | 6/2011 | Dodd | H04N 21/43622 725/78 |
| 2014/0047487 A1* | 2/2014 | Guedalia | H04L 67/16 725/80 |

(Continued)

*Primary Examiner* — Hieu T Hoang
(74) *Attorney, Agent, or Firm* — Pierce Atwood LLP

(57) ABSTRACT

Example embodiments provide techniques for configuring a system to receive an input at a source device and present an output at another device within the same space as the source device. The output device may be selected based on various factors relating to the capabilities of the output device, the type of output responsive to the user input, whether the output device is active, whether the output device was recently used and others.

20 Claims, 25 Drawing Sheets

(56) References Cited

U.S. PATENT DOCUMENTS

| | | | |
|---|---|---|---|
| 2016/0155443 A1* | 6/2016 | Khan | G06F 1/3203 |
| | | | 704/275 |
| 2016/0182938 A1* | 6/2016 | James | H04N 21/4222 |
| | | | 704/275 |
| 2017/0025124 A1* | 1/2017 | Mixter | G10L 15/32 |
| 2017/0090864 A1* | 3/2017 | Jorgovanovic | G10L 21/0332 |
| 2017/0208363 A1* | 7/2017 | Glazier | H04N 21/41407 |
| 2018/0061419 A1* | 3/2018 | Melendo Casado | G10L 15/22 |
| 2018/0121158 A1* | 5/2018 | Hinokio | H04R 3/12 |
| 2018/0144748 A1* | 5/2018 | Leong | G06F 3/165 |
| 2018/0146156 A1* | 5/2018 | Lee | H04N 5/63 |
| 2018/0213009 A1* | 7/2018 | Segal | G06F 16/9537 |
| 2018/0233136 A1* | 8/2018 | Torok | G06F 3/165 |
| 2019/0089752 A1* | 3/2019 | Choe | H04L 12/2829 |
| 2019/0246075 A1* | 8/2019 | Khadloya | G06K 9/00771 |
| 2019/0259388 A1* | 8/2019 | Carpenter, II | G06K 9/00335 |
| 2020/0012273 A1* | 1/2020 | Kim | G06F 3/165 |
| 2020/0034114 A1* | 1/2020 | Angel | G10L 15/22 |
| 2020/0103978 A1* | 4/2020 | Mixter | G06K 9/6267 |
| 2020/0137175 A1* | 4/2020 | Ganci, Jr. | H04L 67/125 |
| 2020/0145244 A1* | 5/2020 | Hollinger | H04L 65/1059 |
| 2020/0193982 A1* | 6/2020 | Kim | G06F 3/167 |
| 2020/0252686 A1* | 8/2020 | Li | G06F 1/3231 |
| 2020/0312315 A1* | 10/2020 | Li | G10L 15/22 |

* cited by examiner

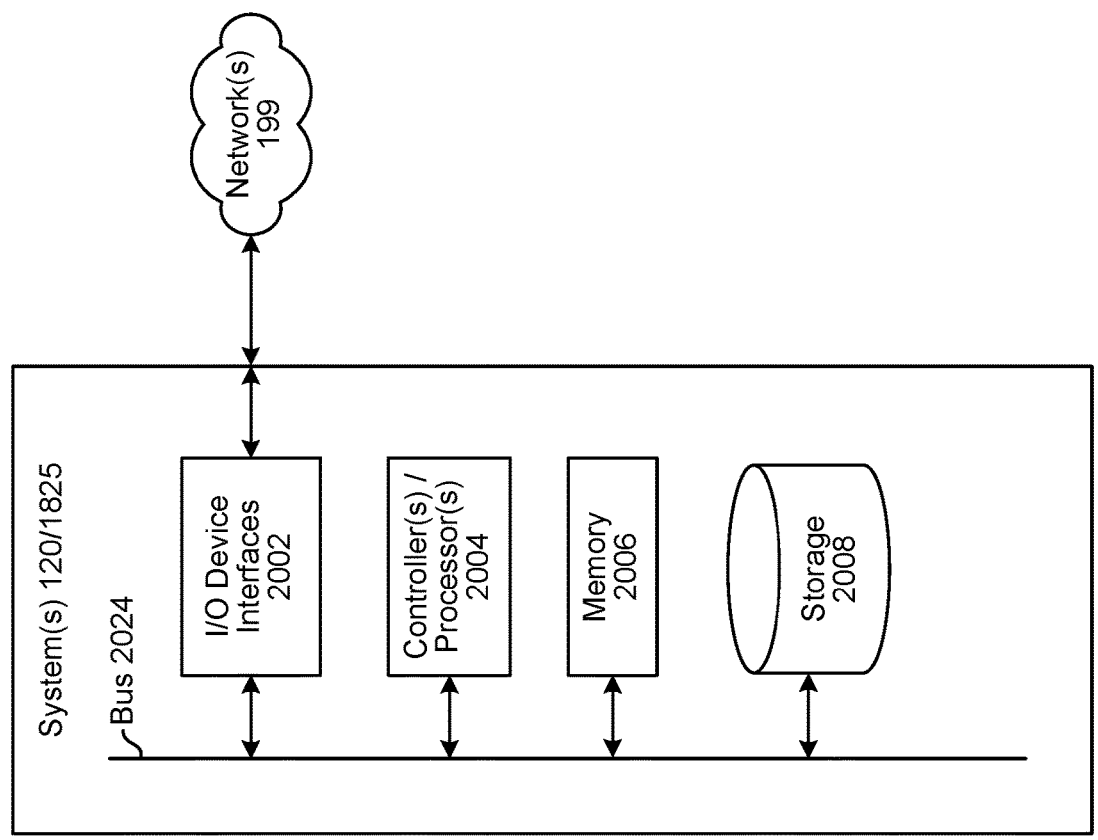

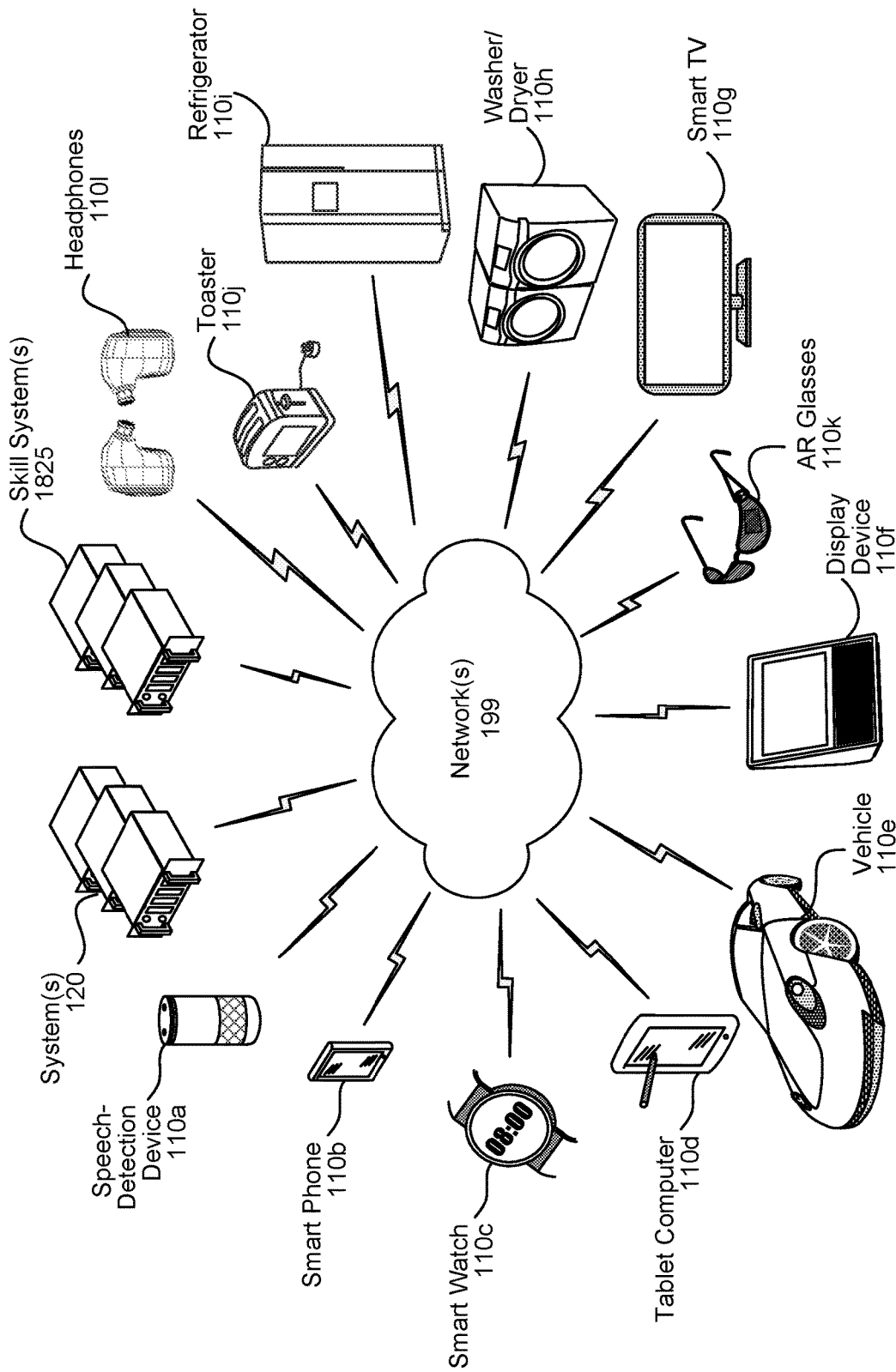

OUTPUT DEVICE SELECTION

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 20 is a block diagram conceptually illustrating example components of a system, in accordance with embodiments of the present disclosure.

FIG. 21 illustrates an example of a computer network for use with the overall system, in accordance with embodiments of the present disclosure.

DETAILED DESCRIPTION

Figure 1:
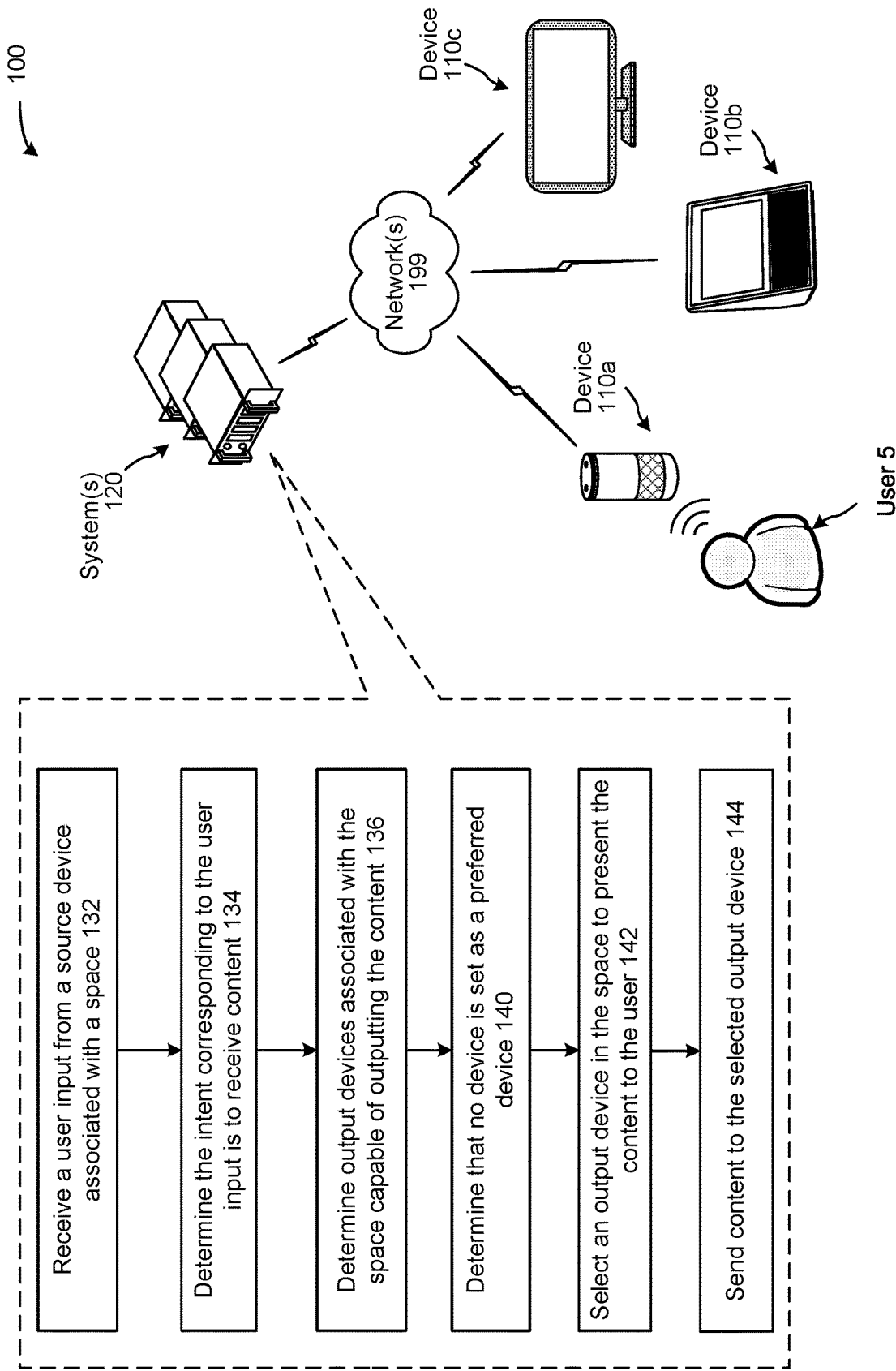
FIG. 1 illustrates a system for selecting an output device to respond to a user input received from a source device, in accordance with embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech. ASR, NLU, and TTS may be used together as part of a speech processing system.

Certain systems may perform actions in response to user inputs, which may originate as user speech. For example, a system may output weather information in response to a user input corresponding to "Alexa, what is the weather today." For further example, a system may play the song Africa by Toto in response to a user input corresponding to "Alexa, play Toto music." In another example, a system may play the movie The Lion King in response to a user input corresponding to "Alexa, play the Lion King movie."

Users often have multiple devices in their home, vehicle, work or otherwise near them. One or more of those devices may receive the user input (e.g., the device(s) closest to the user, such as an electronic ring, electronic watch, smart phone, electronic eyeglasses, etc.), and the device that receives the input, traditionally, also presents the output. A system may also be configured such that the input is received at a first device and the output is presented by a second device, thus, providing mechanisms for decoupling the input and output. Such decoupling may be complex depending on the number of potential input/output (I/O) devices in a space and their particular device configurations/capabilities (such as if a device has a display screen or other video output capability, if it is capable of audio output, if it is capable of high-quality audio output, or the like). Further, complexities arise as a result of output data type, for example if certain output data includes image and/or video data, normal audio data, high quality audio data (e.g., for a movie or music), or the like. The present disclosure offers techniques for improving the decision making and output of particular output data within a particular space occupied by multiple different devices. While a user may provide user preferences or other data that may be stored in a user profile to indicate how such output may be handled for a particular space, the present system may also operate various processes for coordinating input and output for devices within a space.

The present disclosure relates to, for example, a household that contains numerous devices capable of receiving inputs (for example, via a microphone, computer-vision processing, gesture detection, or the like) and numerous devices that are integrated with a system to present outputs. Devices capable of receiving inputs may include a combination of I/O combined devices and input-only devices. Input-only devices may be include smart light switches, while I/O combined devices may include thermostats, smart speakers, wearables, and the like. Devices capable of presenting outputs may include a combination of headless devices (devices without displays, such as Echo devices, smart speakers, etc., and peripheral devices like earbuds that pair to another device, etc.), multi-modal devices (such as tablets, Echo Show devices, etc.), display-only devices (like computer monitor, smart picture frame, etc.), and the like. The system of the present disclosure provides for a predictable user experience in such households by enabling users to consume output experiences on devices that may be different from the input device without explicitly naming or selecting the target output device in the user input. In the system of the present disclosure a variety of outputs, including dialog, media, alerts, notifications, and visuals, may be targeted/sent to the most suitable device based on the user's expressed preferences and/or the context of the user input.

The system of the present disclosure may improve a user experience by determining for the user the best output device available within a space (or proximate to the input device) for a particular user input that may be received by another device within the space, even if the device selected for the output differs from the device that received the input. The system may provide consistency with respect to which devices provide an output to the user, while selecting the user's preferred device, when it is capable of presenting the requested output. The system also provides a user interface to enable the user to assign devices to each space within the user's household, workplace, etc., configure a preferred device for each space and configure the system to select the best output device for the space.

The present disclosure enables users to de-couple their devices to use the best audio and visual outcome for their request. In a non-limiting example, when a user asks for music, the system may direct the output data for the request to the best audio speaker in the same space (proximate to) as the device receiving the request. In another example, when the user asks a question, the system may use the fastest device within the space (e.g., the device that results in a lowest latency experience) to provide the user with an answer. In some cases, where the user may benefit from a visual support to their answer, the system may use a device with a screen in the space (which may be in addition to or instead of a device with an audio output). On the other hand, when the user asks to play a movie, the system uses the TV or another display device in the space to respond to the user's request irrespective of which device captures the user request.

FIG. 1 illustrates a system configured to determine an output device to respond to a user input received from a source device. Although the figures and discussion illustrate certain operational steps of the system in a particular order, the steps described may be performed in a different order (as well as certain steps removed or added) without departing from the intent of the disclosure. As shown in FIG. 1, the system 100 may include multiple devices 110a, 110b, 110c local to a user 5 and one or more systems 120 connected across one or more networks 199. The device 110a may be a source device that receives a user input, and the devices 110b, 110c may be output devices in the same space as the source device 110a. The system may determine which output device 110b or 110c to send output to present to the user 5 in response to the user input, where the user input does not include a target output device. As used herein, 'space' may refer to a defined area within which multiple devices 110 are located. The devices 110 may be located in the space such that an input/source device 110a are proximate (physically proximate, physically close, etc.) to other devices 110b, 110c capable of presenting an output, and so that an output to the user input is presented via the device 110b and/or 110c that is close to the device 110a that captured the user input. Thus, the output may be presented to the user 5 via a device (110b, 110c) that is close to the user 5, even though another device (110a) captured the input.

The system(s) 120 receives (132) a user input from the source device (e.g., device 110a) associated with a space. The user input may be audio data representing an utterance spoken by the user 5 and captured by the device 110a. The system(s) 120 may perform ASR processing using the audio data to determine text data corresponding to the utterance. Details on how the system performs ASR processing are described below. The system(s) 120 may perform NLU processing on the text data to determine an intent corresponding to the user input. Details on how the system performs NLU processing are described below in reference to FIG. 18.

The source device 110a may be associated with a particular space within the user's household for example, such as, kitchen, living room, bedroom, etc. The source device may be associated with a space within the user's workplace or other locations, such as car, main office, work common areas, etc. The user may provide information to the system(s) 120 to associate a space to the devices and the information may be stored in profile storage 1870. Each of devices 110 may be identified by a name or other device identifiers. Details on how the devices can be assigned to a space are described in connection with FIGS. 2-9, although other techniques may be used. For example, the system(s) 120 may determine an area corresponding to a space using various data, for example, using data from multiple sensors (e.g., sensor fusion), service set identifiers (SSID) corresponding to Wi-Fi networks, strengths of Wi-Fi/Bluetooth signals, device groups formed using echo spatial perception (ESP), "friendly names" assigned by the user (e.g., kitchen light, living room Echo, etc.), device type identifiers (e.g., "stove", "microwave", etc.), and data that may otherwise indicate a device's location within a particular area.

The system(s) 120 determines (134) that the intent corresponding to the user input is to receive content. The user input may not include a target output device. The intent may be to receive audio content, visual content and/or video content. For example, the user input may be "Alexa, play The Lion King movie." The system(s) 120 determines that the intent is to receive video content corresponding to the movie The Lion King.

The system(s) 120 determines (136) output devices associated with the space that are capable of outputting the content requested by the user. The system(s) 120 may use data associated with the user profile to determine which devices are in the same space as the source device. For example, the system(s) 120 may determine that the devices 110*b* and 110*c* are in the same space as the source device. In determining the output devices associated with the space, the system(s) 120 is determining the output devices that are proximate (close) to the source device.

The system(s) 120 determines (140) that no device is assigned, classified or otherwise identified as a preferred device for the space. In other words, the system(s) 120 determines that the devices 110*a*, 110*b*, 110*c* are unclassified as preferred devices for the user profile. In some cases, the user 5 may have defined or selected one of the devices 110*b*, 110*c* as the preferred device for responding to user inputs received at the source device in the space. The system(s) 120 checks that the user 5 has not specified a preferred device for this space. The user 5 may have provided permissions to the system(s) 120 previously to select the best output device for user inputs received at the source device in this space.

The system(s) 120 selects (142) one of the output devices in the space to output the content to the user 5. Details on the various factors used in selecting the best output device in the space are described in relation to FIGS. 10-17. In some cases the system(s) 120 may determine the best output device based on the type of content requested by the user 5. For example, for the user input "Alexa, play The Lion King movie" received at the source device 110*a* associated with the user's "living room" space, the system(s) 120 may determine that the television associated with the user's living room is the best device to respond to the user request since the intent is to receive video content. In another example, for the user input "Alexa play music" received at the source device 110*a* associated with the user's kitchen space, the system(s) 120 may determine that the premium speakers (not shown) associated with the user's kitchen is the best device to respond to the user request since the intent is to receive audio content. The system(s) 120 sends (144) the content to the selected output device to present the user. The premium speakers may be a high quality audio output component based on the quality of audio output produced by the component.

Other factors that the system(s) 120 may consider in selecting the best output device for the space are whether both audio and visual content can be provided in response to the user input, which devices are powered on, which devices are in ready-state mode, which devices were most recently used, which devices are presently outputting content, and the like.

In some embodiments, the system(s) 120 may determine to send the output to a device that is capable of outputting audio and visual content based on determining that a user experience may be enhanced if both audio and visual content are presented. In such cases, an output the user input may not necessarily require both audio and visual content. For example, for a user input "what is a comet?" the system may traditionally output TTS generated audio explaining what a comet is. The system(s) 120 of the present disclosure may also include an image of a comet in the output to show the user what a comet looks like. As such, the system(s) 120 may select an output device capable of outputting audio and visual content. Similarly, for a user request "show me the weather" the system may output visual content representing the weather forecast. The system(s) 120 may also determine to include audio explaining the weather while outputting the visual content, and may therefore select a device capable of outputting both audio and video content.

In some embodiments, the system(s) 120 may determine to send the output to a device in a space that the user is approaching. In some embodiments, the system(s) 120 may determine to initially send the output to a first device in a first space, and then send the output to a second device in a second space based on the user moving from the first space to the second space so the user can continue receiving the output. For example, while in a vehicle, the user may say "play my playlist." The input may be captured by the mobile device associated with the user in the vehicle, and the system(s) 120 may output the audio content responsive to the user input via the speakers in the vehicle. When the user exits the car and approaches the user's home, the system(s) 120 may send the audio content to one or more output devices in the user's home, for example, the speakers closest to the front door of the home. In another example, if the user is exiting the vehicle and entering the home, and the user input "play my playlist" is captured by the user's mobile device, the system(s) 120 may send the audio output to the speakers located in the house.

Figure 2:
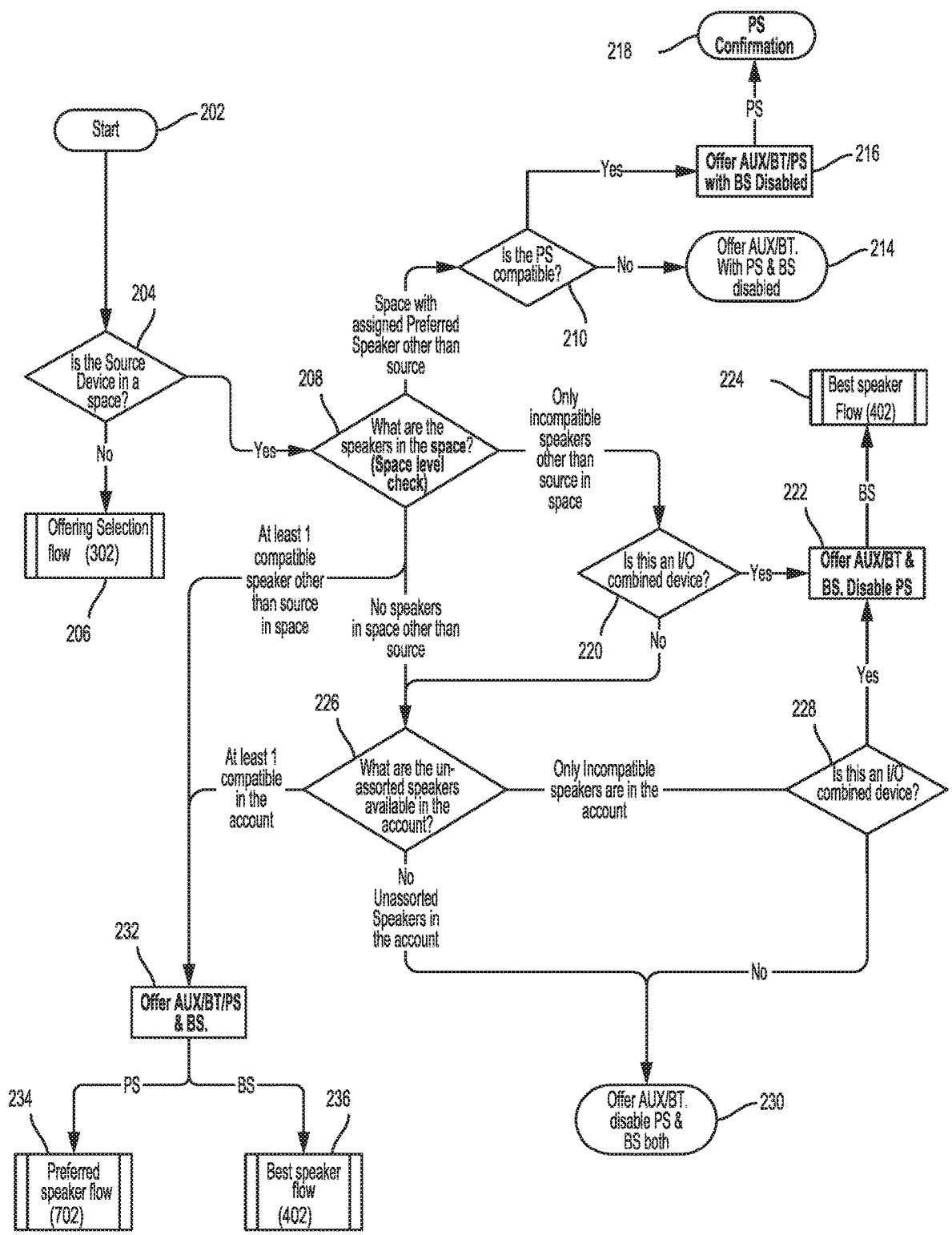
FIG. 2 is a flowchart illustrating a process for determining which input/output (I/O) setup process to present to a user, in accordance with embodiments of the present disclosure.

FIG. 2 illustrates a flowchart for determining which I/O setup process to present to a user, in accordance with embodiments of the present disclosure. The flowchart of FIG. 2 illustrates a process for the system(s) 120 to determine which user interface flow to select to present to the user. The user interface flows enable the user to select a preferred output device or let the system to select the best output device for when an input is received/captured by a source/input device.

At step 202, the system(s) 120 receive an input or data indicating a source device associated with the user that may receive/capture an input from the user. At step 204, the system(s) 120 determines if the source device is assigned to or associated with a 'space.' As used herein, 'space' refers to a location, an area, a position, etc. where a device may be located. The space may be a designated area/space by the user, and may be associated with a user-specified name. For example, spaces within a user's household may include bedroom, bathroom, kitchen, living room, etc. Such spaces are associated with the user profile (by storing data in profile storage 1870) and may be identified using user-specified or system-specified names and/or other identifiers. As another example, spaces associated with a user profile may include work, car, garage, backyard, and the like.

The system(s) 120 may determine whether the source device is assigned to a space associated with the user profile. If the source device is not assigned to any space, then at step 206 the system(s) 120 proceeds with the offering selection flow of FIG. 3, starting at step 302.

If the source device is assigned to a space associated with the user profile, then at step 208 the system(s) 120 determines which other devices capable of presenting an output (e.g., speakers, TVs, etc.) are assigned to that space. If a device, other than the source, is assigned to the space and is indicated as the preferred output device/speaker, then the system(s) 120 continues to step 210. A device may be indicated by the user as the preferred device to present an output and the user profile may include data indicating the device as being the preferred output device for that space.

At step 210, the system(s) 120 determines if the preferred device/speaker (PS) is compatible to present the output generated by the system(s) 120. For example, the system(s) 120 may perform text-to-speech (TTS) processing to generate audio data representing synthesized speech that is to be outputted by the preferred device. Some devices are not configured to or capable of outputting synthesized speech as generated by the system(s) 120. As another example, some devices (e.g., headless devices, devices without a display screen) are not configured to or capable of outputting visual data. Therefore, the system(s) 120 at step 210 checks that the preferred device is capable of outputting the output data corresponding to the user input.

If the preferred device is compatible, then at step 216 the system(s) 120 determines to offer the potential output devices as auxiliary (AUX)/Bluetooth (BT)/PS, while disabling/not performing the best output device/speaker (BS) process flow. The best speaker flow is when the system(s) 120 determines the best output device for the corresponding user input, rather than selecting the output device based on user preferences. At step 216, the system(s) 120 offering potential output devices as AUX/BT/PS refers to the system presenting the user with potential output devices to select from, including devices that may be connected to the system using an auxiliary port or a Bluetooth connection. For example, if the source device is device 110a, one or more devices, such as speakers, may be connected to the device 110a via an auxiliary port of the device 110a. Alternatively, one or more speakers may be connected to the device 110a via a Bluetooth connection. The potential output devices presented to the user also include the device indicated as the preferred output device/speaker (PS) by the user. The preferred output device may be connected to the same wireless network as the source device.

At step 216, the system(s) 120 may receive an input from the user indicating that the preferred output device should be used to present the output to the user. At step 218, the system(s) 120 confirms selection of the preferred output device by, for example, displaying a message on the user interface screen.

If at step 210 the system(s) 120 determines that the preferred output device is not compatible, then at step 214 the system(s) 120 determines to offer the potential output devices as AUX/BT, with the preferred output device and the best output device flow being disabled. That is, at step 214 the system(s) 120 presents the user with one or more devices that are connected to the source device via an auxiliary port or a Bluetooth connection. Alternatively, the system(s) 120 may inform the user that he/she can connect an output device to the source device via an auxiliary port or Bluetooth connection to receive the output. At step 214, the system(s) 120 does not present the preferred output device (because it is incompatible with respect to not being capable of outputting the requested content) as a potential output device, and the system(s) 120 also does not determine the best output device because a preferred output device is already assigned for that space (as determined at step 208).

If one or more devices, other than the source device and not indicated as a preferred output device, are assigned to the space but are incompatible for presenting an output as generated by the system(s) 120, then the process proceeds to step 220. At step 220, the system(s) 120 determines if the source device is an I/O combined device. That is, the system(s) 120 determines if the source device is capable of presenting the output corresponding to the user input. For example, the source device may only include a microphone capable of receiving a voice input from the user, but may not include speakers to output audio in response the user input. In that case, the source device is not an I/O combined device, and the process proceeds to step 226. If the source device includes speakers and/or a display screen, then the system(s) 120 determines that the source device is an I/O combined device and proceed to step 222.

At step 222, the system(s) 120 determines to offer the user the potential output devices to select from as AUX/BT and the best output device selected by the system, with disabling the preferred output device flow. That is, the system(s) 120 presents the user with the option to select (or connect) an output device to the source device using the auxiliary port or Bluetooth connection, or let the system select the best device for presenting the output. The system(s) 120 may receive an input from the user indicating that the system can select the best output device, in response to which, the system(s) 120, at step 224, proceeds with the best output device/best speaker (BS) flow of FIG. 4 (starting at step 402).

If at least one device, other than the source device and not indicated as a preferred output device, is assigned to the space and is compatible for presenting an output, then the process goes from step 208 to step 232. If no other devices are assigned to the space, then the process goes from step 208 to step 226. If step 220, the system(s) 120 determines that the source device is not a combined I/O device, then the process proceeds to step 226.

At step 226, the system(s) 120 determines if there are any devices associated with the user profile that have not been assigned to a space, and identifies them. If there is at least one compatible device associated with the user profile and not assigned to a space (referred to as an un-assorted device), then the process proceeds to step 232. A compatible device is a device capable of outputting the output data generated by the system(s) 120 in response to the user input.

At step 232, the system(s) 120 determines to offer the user the potential output devices as AUX/BT, preferred device flow or best device flow. That is, the system(s) 120 presents the user with the option to select (or connect) an output device to the source device using the auxiliary port or Bluetooth connection. The system(s) 120 also presents the user with the option to select one of the devices displayed (including the un-assorted compatible device determined at step 226) as the preferred output device, or to allow the system to select the best output device. If the user indicates selection of a preferred device/preferred speaker (PS), then the system(s) 120 continues to step 234 with the preferred speaker flow of FIG. 7 (starting at step 702). If the user indicates selection of allowing the system to select the best output device, then the system(s) 120 continues to step 236 with the best speaker flow of FIG. 4 (starting at step 402).

If at step 226, the system(s) 120 determines that the other devices associated with the user profile are incompatible (not capable of outputting the output data), then the process proceeds to step 228. At step 228, the system(s) 120 determines if the source device is an I/O combined device. If the source is an I/O combined device, then the process proceeds to step 222.

If at step 228, the system(s) 120 determines that the source device is not an I/O combined device, then the process proceeds to step 230. If step 226, the system(s) 120 determines that are no other devices associated with the user profile, then the process proceeds to step 230. At step 230, the system(s) 120 determines to offer the user with the potential output devices as AUX/BT with disabling the preferred device and best device flows. That is, based on the determinations of the previous steps, the system(s) 120 determines that the only potential output devices available are via an auxiliary port or Bluetooth connection.

Figure 3:
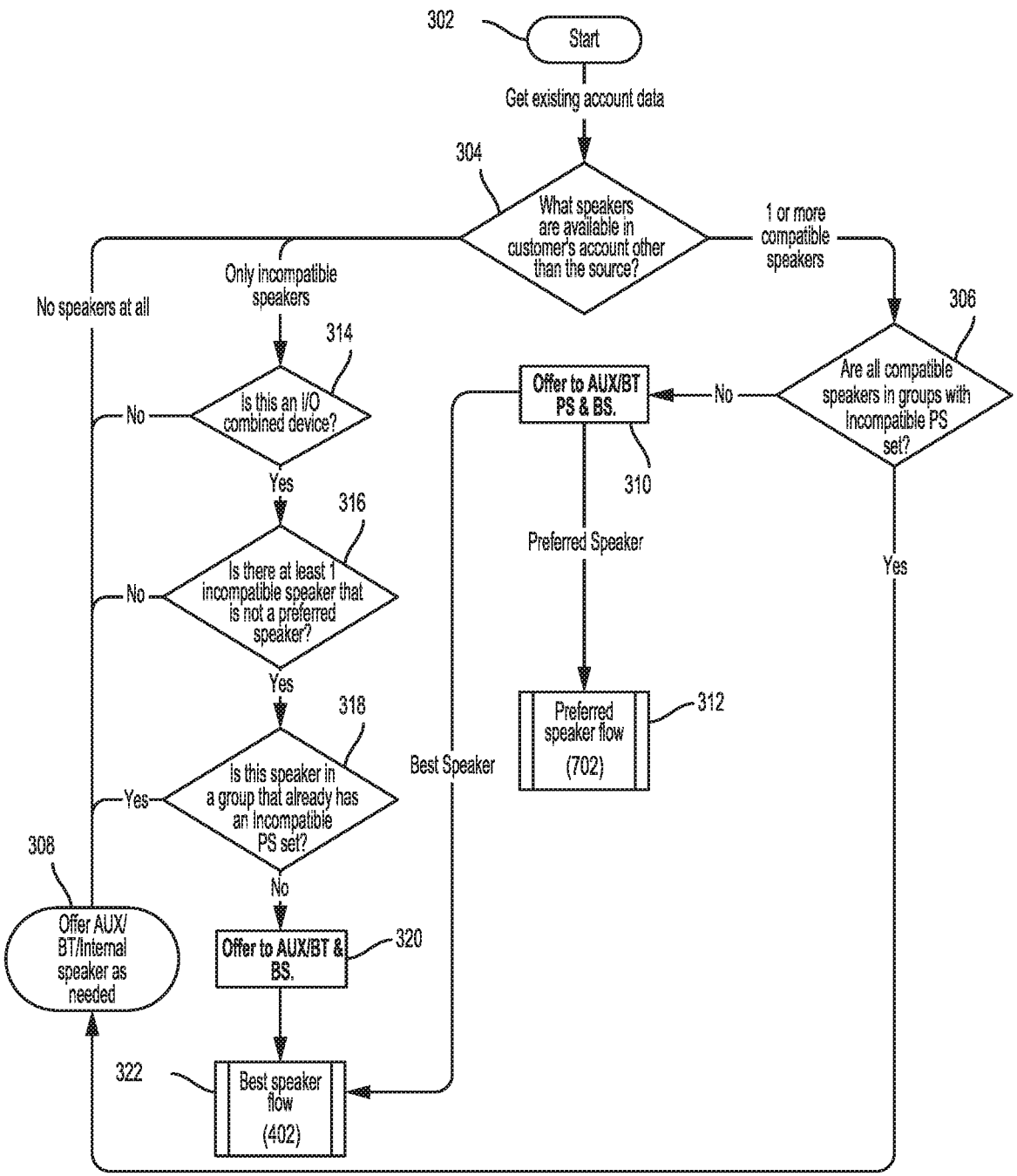
FIG. 3 is a flowchart illustrating a process for determining which I/O setup process to present to a user, in accordance with embodiments of the present disclosure.

FIG. 3 illustrates a flowchart for determining which I/O setup process to present to a user, in accordance with embodiments of the present disclosure. The process starts at step 302 and the system(s) 120 determines existing account data associated with the user profile, specifically the devices associated with the user profile and information relating to those devices, such as a space the device is assigned to, device identifiers, device capabilities, and the like. The system(s) 120, at step 304 determines which output devices/speakers are associated with the user profile other than the source/input device. If there is at least one compatible output device (capable of presenting the output corresponding to the user input), then at step 306 the system(s) 120 determines whether all the compatible output devices are in a group with an incompatible preferred output device. That is, the system(s) 120 determines if a preferred output device is incompatible and whether the other compatible output devices are in the group or same space with the preferred output device. If the other compatible output device is in a group/space with an incompatible preferred device, then at step 308 the system(s) 120 determines to offer the user potential output devices as ones connected to the source device via the auxiliary port or Bluetooth connection. At step 308 the system(s) 120 only offers connected AUX/BT devices because the preferred speaker is incapable of presenting the output to the user request.

If the other compatible output device is not in a group/space with an incompatible preferred device, then at step 310 the system(s) 120 determines to offer the user potential output devices as ones connected to the source device via the auxiliary port or Bluetooth connection, the preferred device flow and the best device flow. If the user provides an input selecting the preferred device flow, then the system(s) 120 presents the user with the preferred device flow of FIG. 7 (starting at step 702). If the user provides an input selecting the best device flow, then the system(s) 120 presents the user with the best device flow of FIG. 4 (starting at step 402).

If at step 304, the system(s) 120 determine that there are no output devices/speakers associated with the user profile other than the source/input device, then the system(s) 120 proceeds to step 308 (offering AUX/BT output devices). If at step 304, the system(s) 120 determines that all the output devices associated with the user profile are incompatible, then the process proceeds to step 314. At step 314, the system(s) 120 determines whether the source/input device is an I/O combined device. If the source device is not an I/O combined device, then the system(s) 120 proceeds to step 308 (offering AUX/BT output device). If the source device is an I/O combined device, then the system(s) 120 proceeds to step 316.

At step 316, the system(s) 120 determines if there is at least one incompatible output device/speaker associated with the user profile that is not indicated as a preferred output device. If there are no such output devices, then the system(s) 120 proceeds to step 308 (offering AUX/BT output device). If there is such as an output device, then at step 318 the system(s) 120 determines if that output device is part of a group/space that includes an incompatible preferred output device. If yes, then the system(s) 120 proceeds to step 308 (offering AUX/BT output devices). If that output device is not part of a group that includes an incompatible preferred output device, then the system(s) 120, at step 320 determines to offer the user the potential output devices as AUX/BT connected devices and the best device flow. If the user provides an input selecting the best device flow, then at 320 the system(s) 120 presents the user with the best speaker flow of FIG. 4 (starting at step 402).

Figure 4:
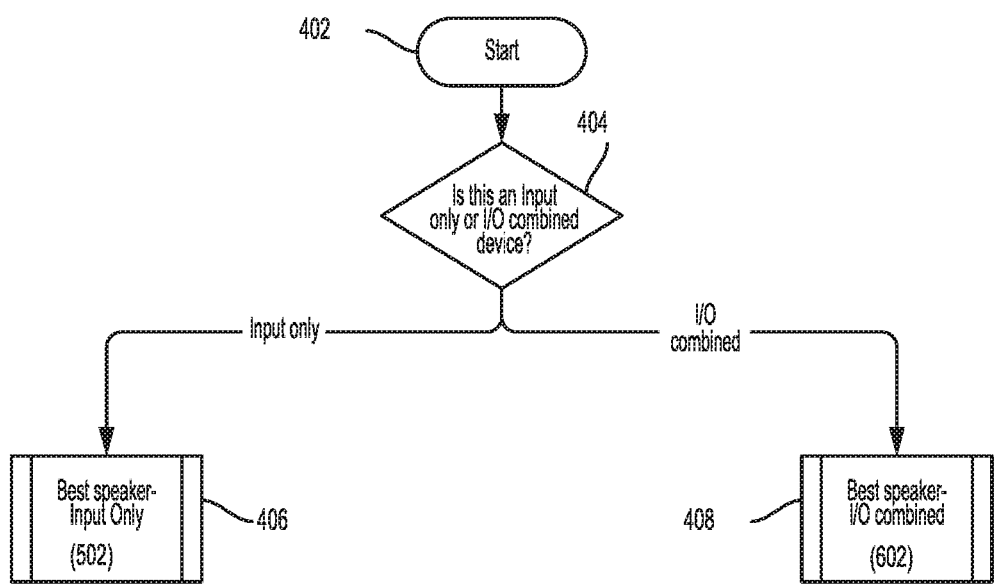
FIGS. 4-6 is a flowchart illustrating a process for setting up to select the best output device, in accordance with embodiments of the present disclosure.
Figure 5:
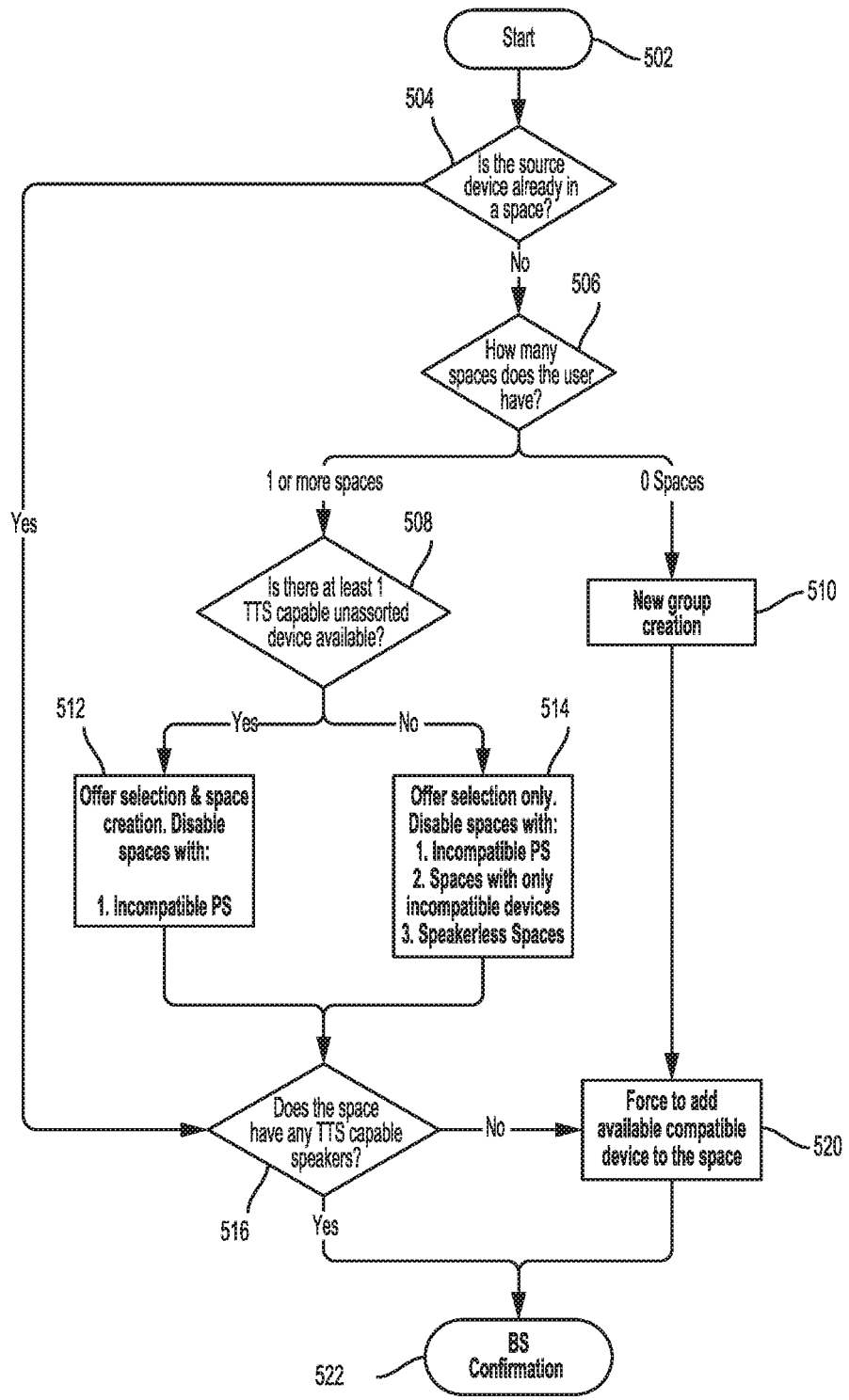
Figure 6:
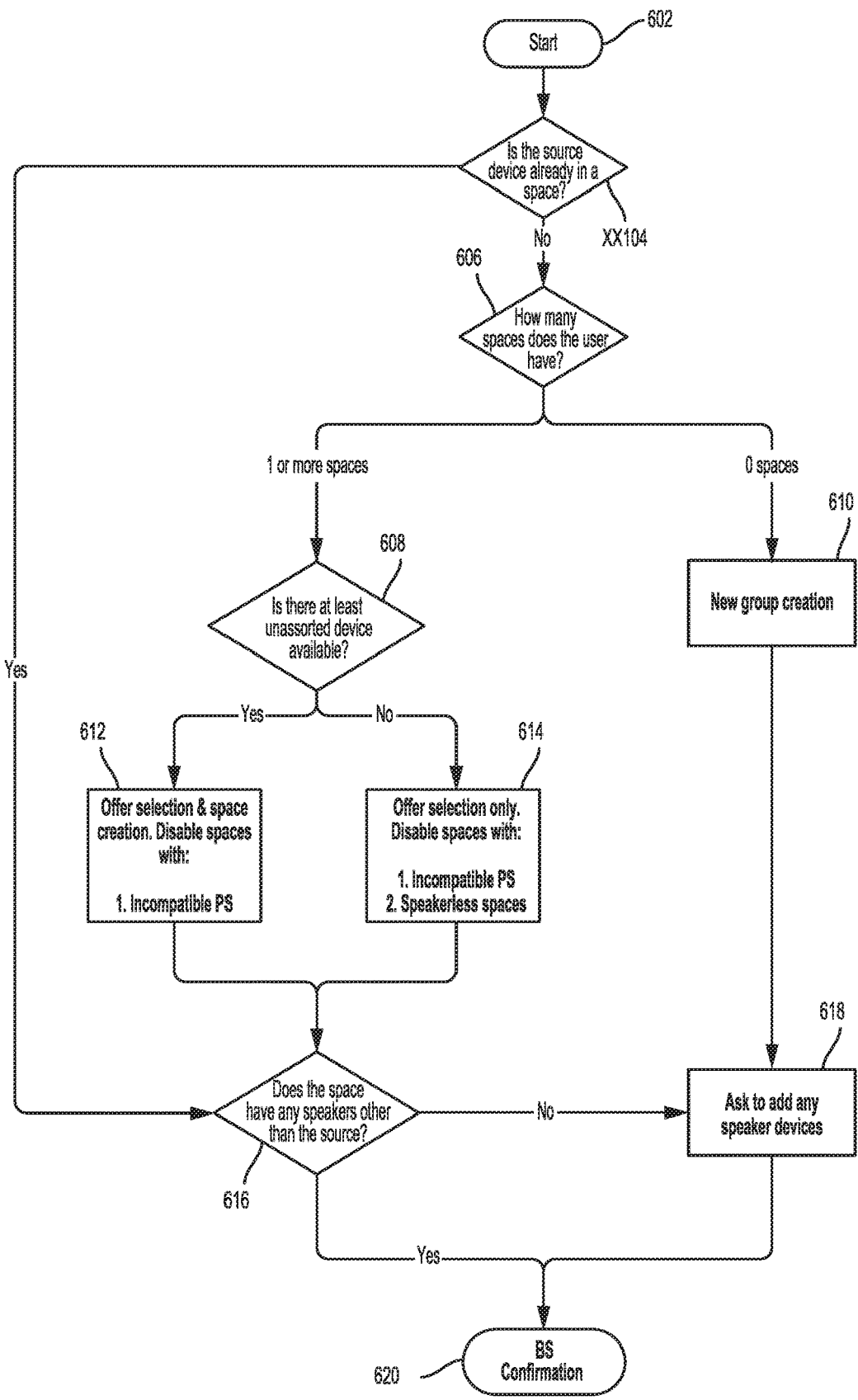

FIGS. 4-6 illustrates a flowchart for selecting the best output device, in accordance with embodiments of the present disclosure. The process starts at step 402 of FIG. 4. At step 404, the system(s) 120 determines whether the source/input device is an input only or an I/O combined device. If the source device is capable only receiving an input (such as devices without any speakers, displays or other components that can present an output to the user), then the system(s) 120 proceeds to step 406 and presents the user with the best device—input only flow of FIG. 5. If the source device is an I/O combined device, then the system(s) 120 proceeds to step 408 and presents the user with the best device— I/O combined flow of FIG. 6.

FIG. 5 illustrates a best device process flow for when the source device is an input only device. The system(s) 120 at step 504 determines if the source device is assigned to a space (based on information retrieved from the user profile). If the source device is assigned to a space, then the process proceeds to step 516. If the source device is not assigned to a space yet, then at step 506 the system(s) 120 determines how many spaces are defined by the user by retrieving information associated with the user profile. If the user profile indicates that there are no spaces associated with the user profile, then the system(s) 120 at step 510 presents the user with a user interface screen to create a new group/space. The system(s) 120 may display devices associated with the user profile to enable the user to select one or more devices to assign to a new space. At step 520, the system(s) 120 receives input from the user adding one or more devices (that are compatible to present an output) to a space. The system(s) 120 may only display compatible output devices for the user to select to add to a space. The process then proceeds to step 522.

If at step 506 the system(s) 120 determines that there are one or more spaces defined by the user, then at step 508 the system(s) 120 determines whether there is at least one compatible output device associated with the user profile that is not assigned to a space. If yes, then at step 512 the system(s) 120 determines to offer the user selection of devices and creation of new spaces, while disabling spaces with incompatible output devices. That is, the system(s) 120 displays one or more user interface screens that enable the user to select devices to create new spaces. The system(s) 120 may not display devices that are incompatible to present an output generated by the system(s) 120.

If at step 508 the system(s) 120 determines that there are no compatible unassigned devices, then at step 514 the system(s) 120 determines to offer the user selection of a space only, while disabling (not displaying) spaces with incompatible preferred devices, spaces with only incompatible devices and spaces that have no devices assigned.

At step 512 and 516, the system(s) 120 receive an input from the user associating devices to one or more spaces. At step 518, the system(s) 120 determines if the user added at least one compatible output device to the space. If not, then the system(s) 120 at step 520 asks the user to add a compatible device to the space. After the user adds a compatible device, then the system(s) 120 proceeds to step 522. If at step 518 the system(s) 120 determines that the space includes a compatible output device, then the system(s) 120 proceeds to step 522.

At step 522 the system(s) 120 may confirm to the user that the best device setup is complete. That is, the system will determine the best device to present an output corresponding to a future user input received at the source device. The system(s) 120 may display a confirmation message and may list all the output devices assigned to the space.

FIG. 6 illustrates a best device process flow for when the source device is an I/O combined device. The process starts at step 602. The system(s) 120, at step 604, determines if the source device is already assigned to a space using information from the user profile. If the source device is already assigned to a space, then the system(s) 120 proceeds to step 616. If the source device is not assigned to a space, then at step 606 the system(s) 120 determines how many spaces are associated with the user profile. If there are no spaces defined by the user, then the system(s) 120 at step 610 presents the user with a user interface screen to create a new group/space. The system(s) 120 may display devices associated with the user profile to enable the user to select one or more devices to assign to a new space. At step 618, the system(s) 120 receives input from the user adding one or more devices (that are compatible to present an output) to a space. The system(s) 120 may only display compatible output devices for the user to select to add to a space. The process then proceeds to step 620.

If at step 606, the system(s) 120 determines that are one or more spaces associated with the user profile, then the system(s) 120 proceeds to step 608, where the system(s) 120 determines if there is at least one unassigned (with respect to space) output device. If there are unassigned output devices, then at step 612 the system(s) 120 determines to offer the user selection of devices and creation of new spaces, while disabling spaces with incompatible output devices. That is, the system(s) 120 displays one or more user interface screens that enable the user to select devices to create new spaces. The system(s) 120 may not display devices that are incompatible to present an output generated by the system(s) 120.

If at step 608 the system(s) 120 determines that there are no unassigned devices, then at step 614 the system(s) 120 determines to offer the user selection of a space only, while disabling (not displaying) spaces with incompatible preferred devices, and spaces that have no devices assigned.

At step 612 and 614, the system(s) 120 receive an input from the user associating devices to one or more spaces. At step 516, the system(s) 120 determines if the user added at least one compatible output device to the space. If not, then the system(s) 120 at step 618 asks the user to add a compatible device to the space. After the user adds a compatible device, then the system(s) 120 proceeds to step 620. If at step 616 the system(s) 120 determines that the space includes a compatible output device, then the system(s) 120 proceeds to step 620.

At step 620 the system(s) 120 may confirm to the user that the best device setup is complete. That is, the system will determine the best device to present an output corresponding to a future user input received at the source device. The system(s) 120 may display a confirmation message and may list all the output devices assigned to the space.

Figure 7:
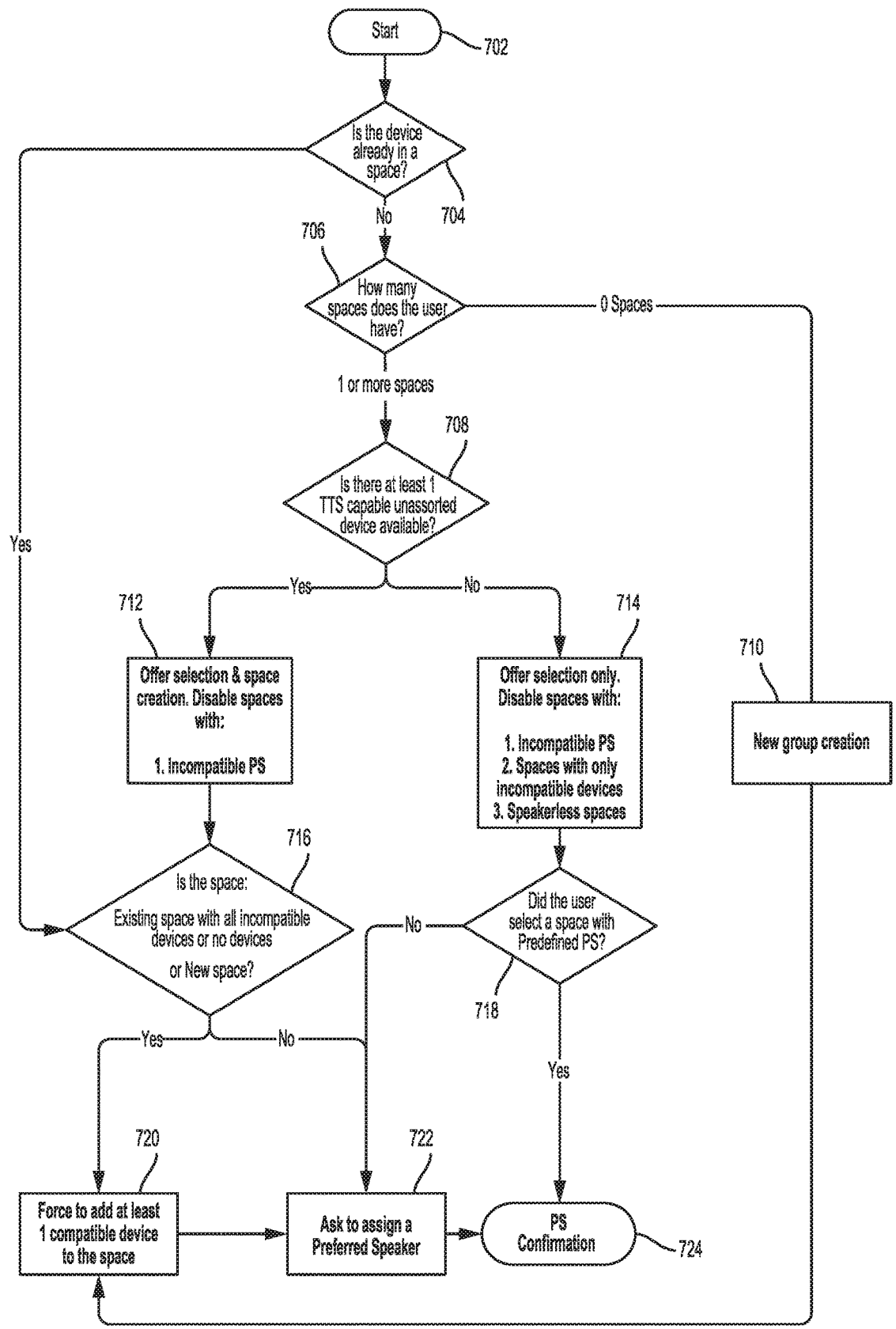
FIG. 7 is a flowchart illustrating a process for determining a user's preferred output device, in accordance with embodiments of the present disclosure.

FIG. 7 illustrates a flowchart for determining a user's preferred output device, in accordance with embodiments of the present disclosure. The process starts at step 702. At step 704, the system(s) 120 determines if the source device is assigned to a space by retrieving information from the user profile. If the source device is assigned to a space, then the process proceeds to step 716. If the source device is not assigned to a space, then the system(s) 120, at step 706 determines how many spaces are associated with the user profile. If no spaces are assigned or defined for the user, then at step 710 the system(s) 120 presents the user with a user interface screen to create a new group/space. The system(s) 120 may display devices, including the source device, associated with the user profile to enable the user to select one or more devices to assign to a new space. At step 720, the system(s) 120 receives input from the user adding one or more devices (that are compatible to present an output) to a space. The system(s) 120 may only display compatible output devices for the user to select to add to a space. The process then proceeds to step 722.

If the user profile has one or more spaces defined, then the system(s) 120 at step 708 determine if there is at least one compatible unassigned device associated with the user profile. If yes, then the process proceeds to step 712. If no, then the process proceeds to step 714.

At step 712, the system(s) 120 determines to offer the user selection of devices and creation of new spaces, while disabling spaces with incompatible output devices. That is, the system(s) 120 displays one or more user interface screens that enable the user to select devices to create new spaces. The system(s) 120 may not display devices that are incompatible to present an output generated by the system(s) 120. At step 712 the system(s) 120 receives input from the user creating a new space or selecting an existing space, and assigning devices to the space. The system(s) 120, at step 716, determines if (1) the space indicated by the user is an existing space that has no devices or all devices in the space are incompatible or (2) the space is newly created. If the space does not have any compatible devices or the space is newly created, then at step 720, the system(s) 120 requests the user to add at least one compatible device to the space. For example, the system(s) 120 may display a message in the user interface: "Please add a compatible device" or "To continue, add a compatible device." If, at step 716, the system(s) 120 determines that the existing space has at least one compatible device, then the process proceeds to step 722.

At step 714, the system(s) 120 determines to offer the user selection of a space only, while disabling (not displaying) spaces with incompatible preferred devices, spaces with only incompatible devices, and spaces that have no output devices assigned. At step 714, the system(s) 120 receives input from the user selecting a space from the displayed list. At step 718, the system(s) 120 determines if the user selecting a space with a predefined/already assigned preferred output device. If yes, then the process proceeds to step 724. If no, then the process proceeds to step 722.

At step 722 the system(s) 120 asks the user to select a preferred output device/speaker. The system(s) 120 may receive input from the user selecting one of the devices as the user's preferred output device for input received at the particular source device. At step 724, the system(s) 120 may confirm to the user that the preferred device setup is complete. That is, the system will use the preferred output device when an input at the source device is received. The system(s) 120 may display a confirmation message and may list all the output devices assigned to the space with the preferred output device marked with a particular icon or indication.

Although some of the figures refer to "speakers," "speaker," speaker devices," or derivations thereof, it should be understood that the process described herein apply to any device capable of presenting an output (audio, visual or other types of output). For example, selecting the best speaker or preferred speaker, may also include selecting the best output device or preferred output device that is capable of outputting video and audio.

FIGS. 8A-8G are conceptual diagrams illustrating user interface screens enabling a user to allow the system to select the best output device. FIGS. 9A-9I are conceptual diagrams illustrating user interface screens enabling a user to select the preferred output device. The user in this example may want to setup an output device for an input only source device that is not assigned to a space yet. The user may want to assign the source device to the "bedroom" space and enable the output to be presented via another device within the bedroom space using a network connection. The bedroom space may already have output devices assigned to it, for example, a Sonos Play (which may be incompatible for presenting a TTS generated synthesized speech output) and a Sonos One (which may be capable of presenting a TTS generated synthesized speech output).

Figure 8A:
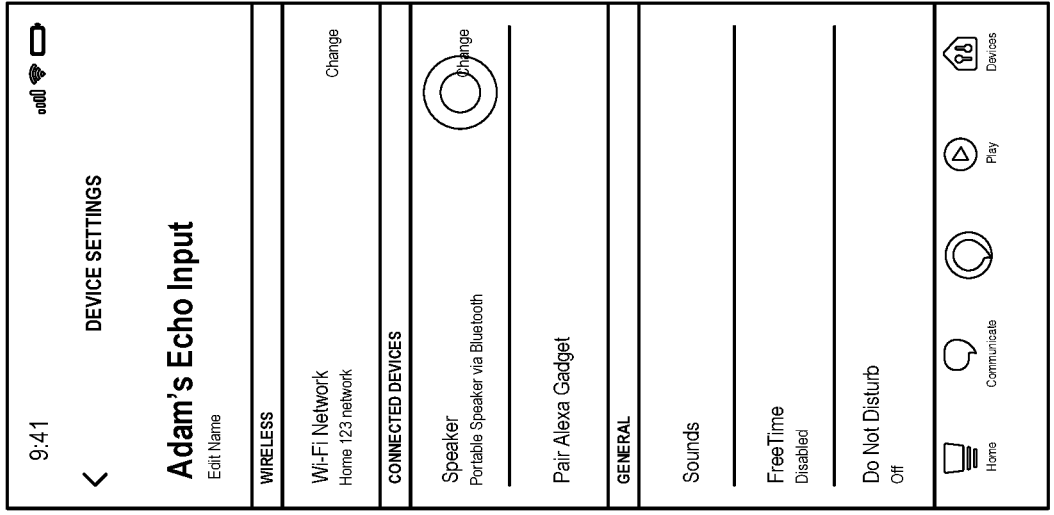
FIGS. 8A-8G are conceptual diagrams illustrating user interface screens enabling a user to allow the system to select the output device.
Figure 8B:
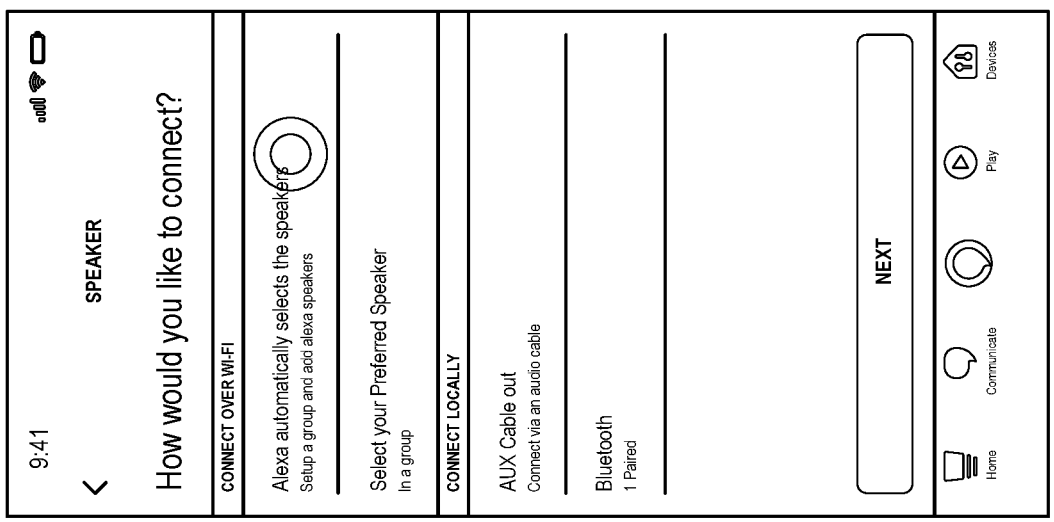
Figure 8C:
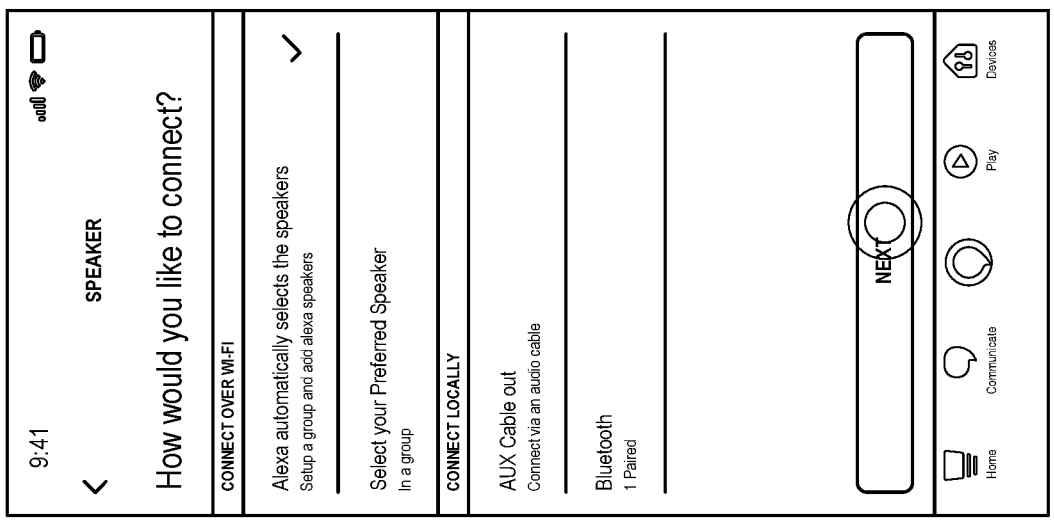

As shown in FIG. 8A, the user may open, in a user interface, device settings corresponding to the source device called "Tyrion's Echo Input." The user may want to configure settings for Tyrion's Echo Input, including the connected devices option. As shown, Tyrion's Echo Input is presently connected via Bluetooth to Portable speaker. The user may select "change," and the user interface screen shown in FIG. 8B may be displayed asking the user "How would you like to connect?" The user may select the option of enabling the system to automatically select the speaker to output an input received by Tyrion's Echo Input, and the user interface screen shown in FIG. 8C may be displayed confirming that the system will automatically select the speaker. The user may select "NEXT" to continue.

Figure 8F:
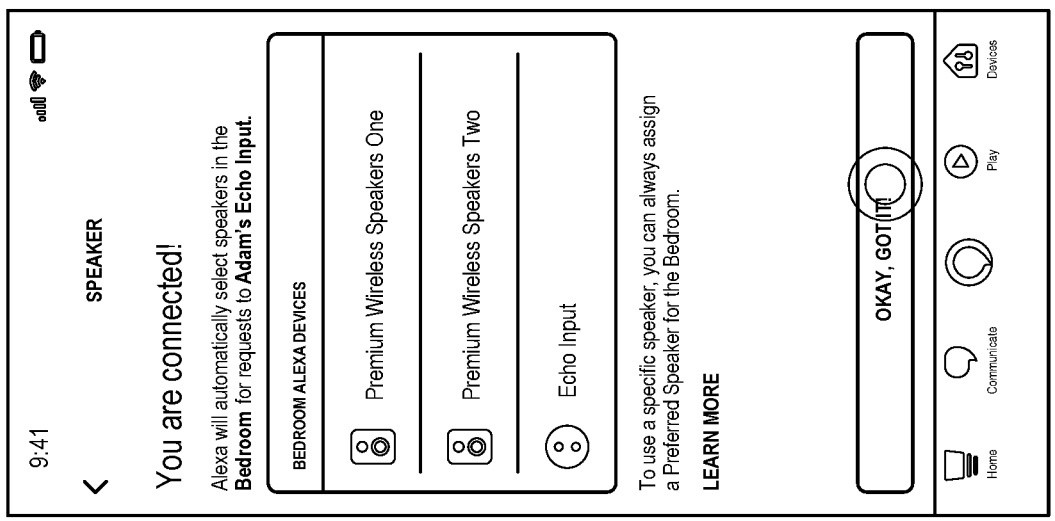
Figure 8E:
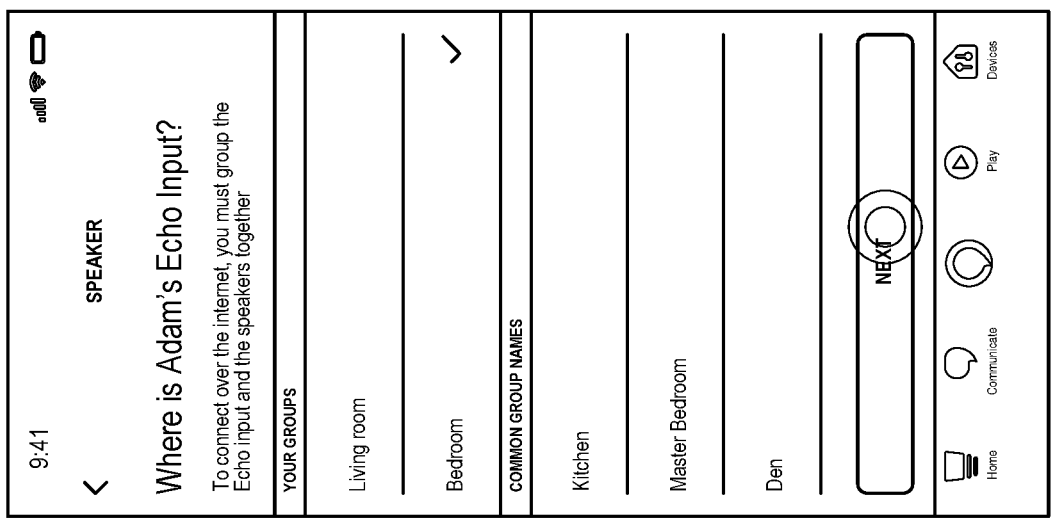
Figure 8D:
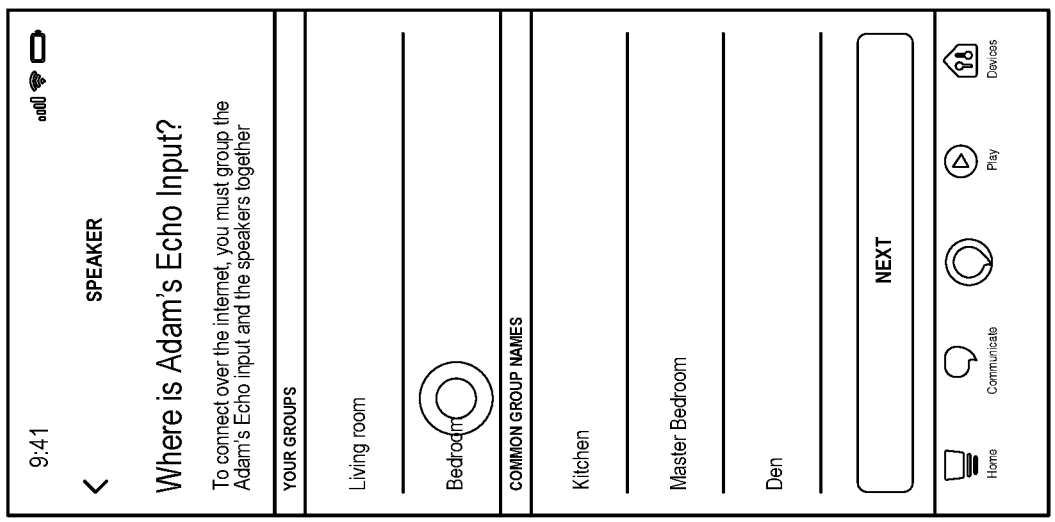
Figure 8G:
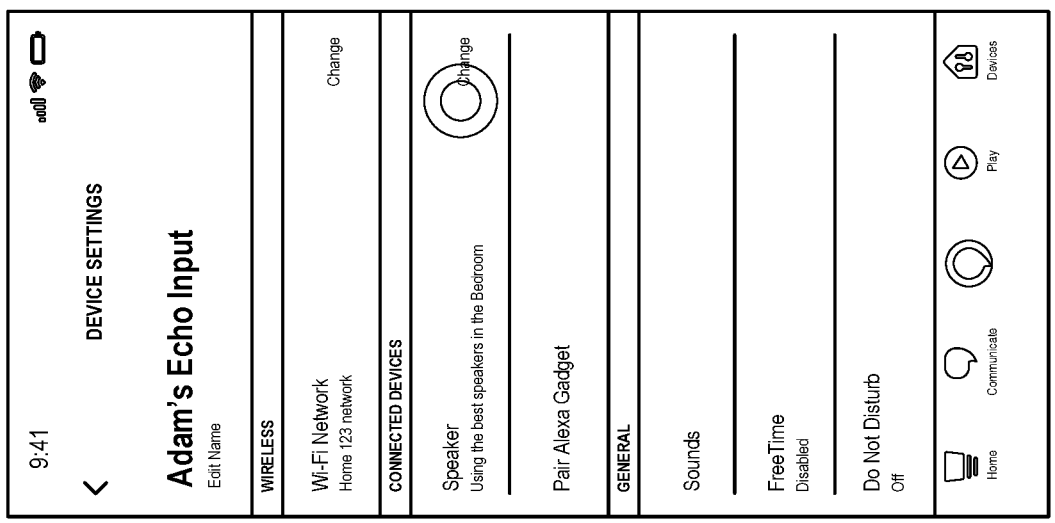

The system(s) 120 may determine that Tyrion's Echo Input is not assigned to a space yet, and then displays the user interface screen of FIG. 8D to enable the user to assign a space to Tyrion's Echo Input. As shown in FIG. 8D, the system(s) 120 may display the spaces already defined by the user in his profile, such as, living room and bedroom. The system(s) 120 may also display other common options for spaces, such as kitchen, master bedroom and den, for the user to create a new space to assign to Tyrion's Echo Input. As shown in FIG. 8D, the user may select bedroom as the space to assign to the source device Tyrion's Echo Input, and FIG. 8E shows the user interface screen confirming the user's selection. The user may select "NEXT" to continue. FIG. 8F shows a user interface screen listing the output devices/speakers associated with the bedroom space, and informing the user that the system will automatically select speakers in the bedroom space for requests received by Tyrion's Echo Input. FIG. 8G shows a user interface displaying the device settings for Tyrion's Echo Input showing that the connected devices configuration is set to using the best speakers in the bedroom. In this manner, a user can assign a space to a source device and configure the system to automatically select an output device in the space for inputs received by the source device.

Figure 9C:
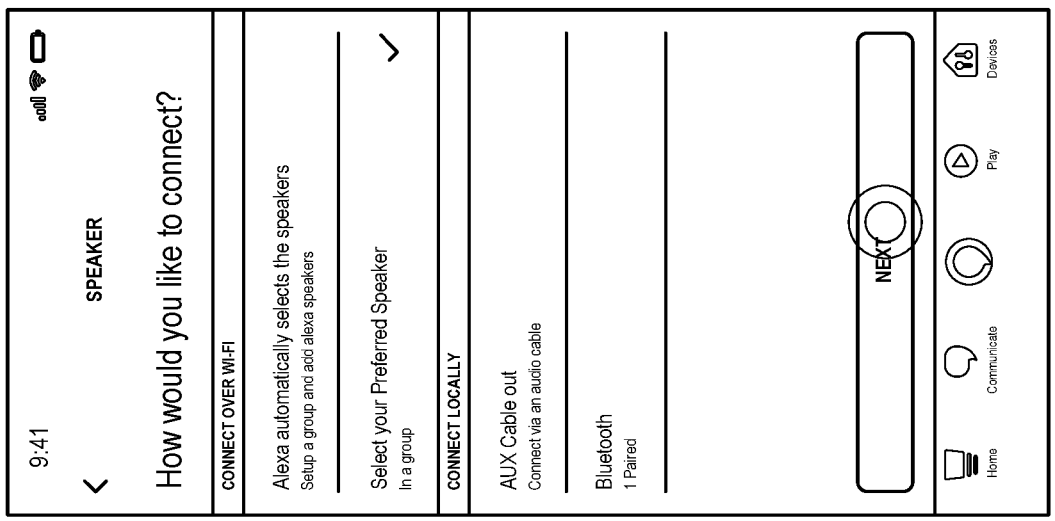
FIGS. 9A-9I are conceptual diagrams illustrating user interface screens enabling a user to select the preferred output device.
Figure 9B:
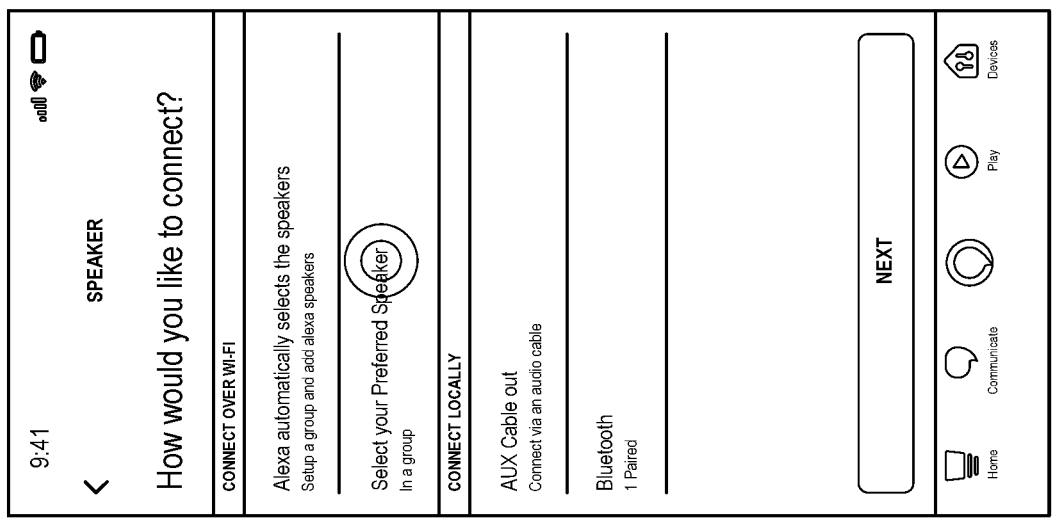
Figure 9A:
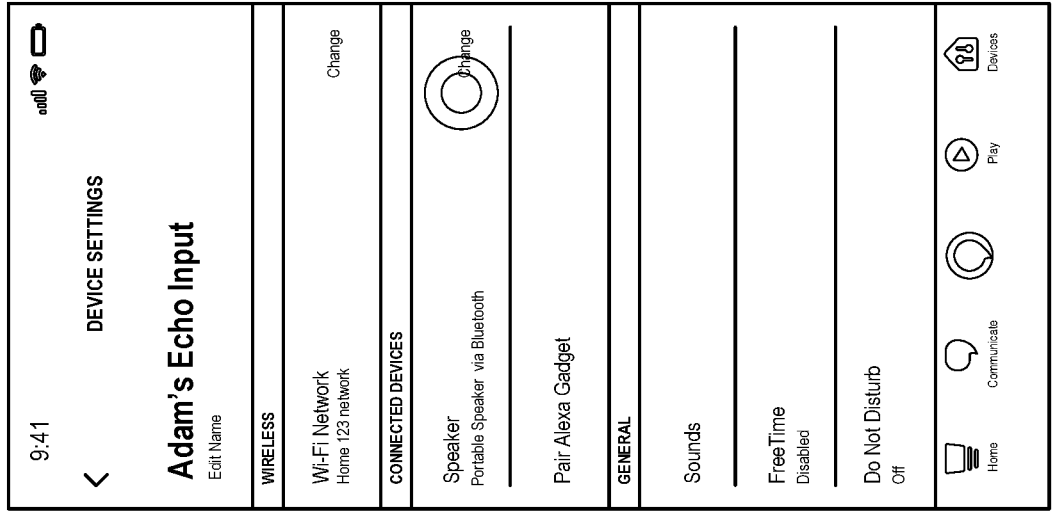

As shown in FIG. 9A, the user may open, in a user interface, device settings corresponding to the source device called "Tyrion's Echo Input." The user may want to configure settings for Tyrion's Echo Input, including the connected devices option. As shown, Tyrion's Echo Input is presently connected via Bluetooth to Portable speaker. The user may select "change," and the user interface screen shown in FIG. 9B may be displayed asking the user "How would you like to connect?" The user may select the option to "Select your preferred speaker." FIG. 9C shows a user interface screen confirming the user's selection, and the user selecting "NEXT" to continue.

Figure 9F:
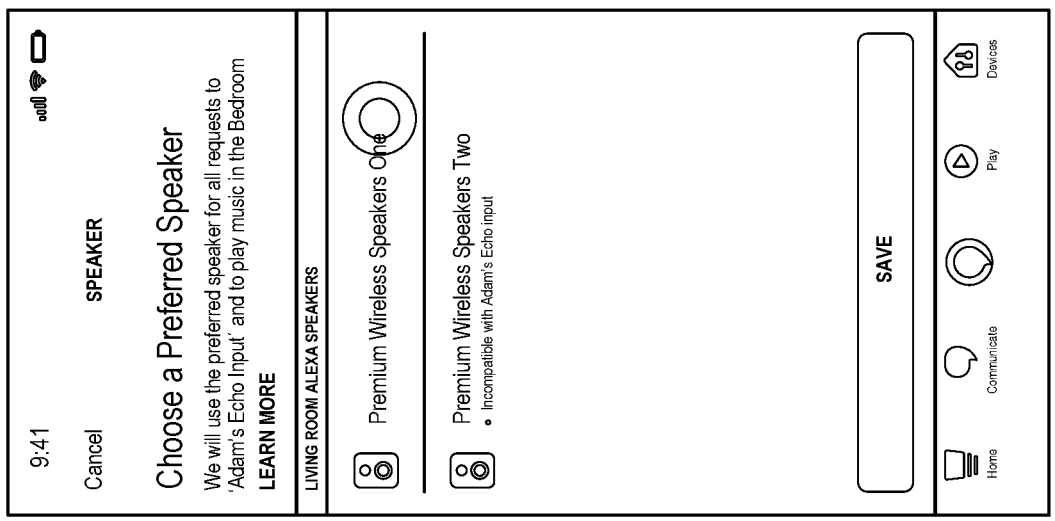
Figure 9E:
Figure 9D:
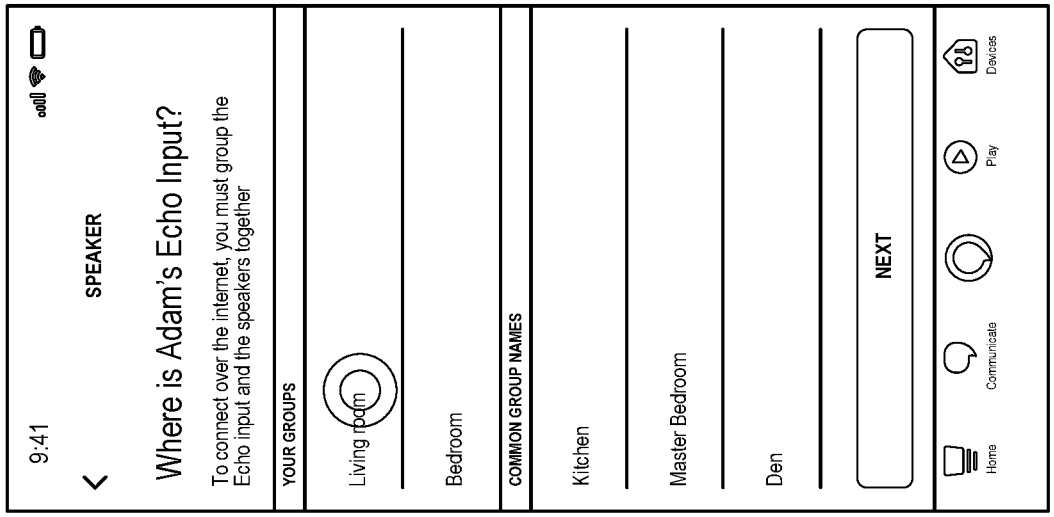
Figure 9I:
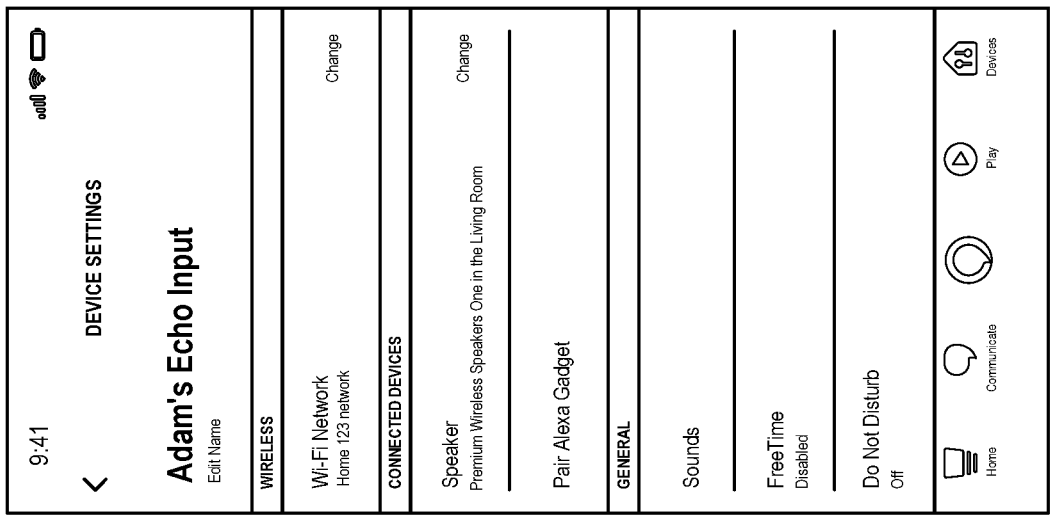
Figure 9H:
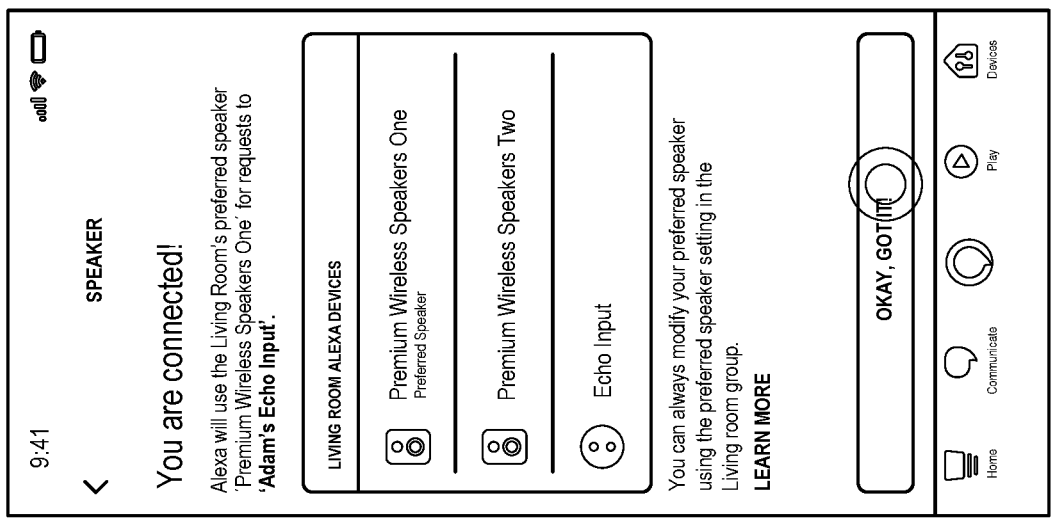
Figure 9G:
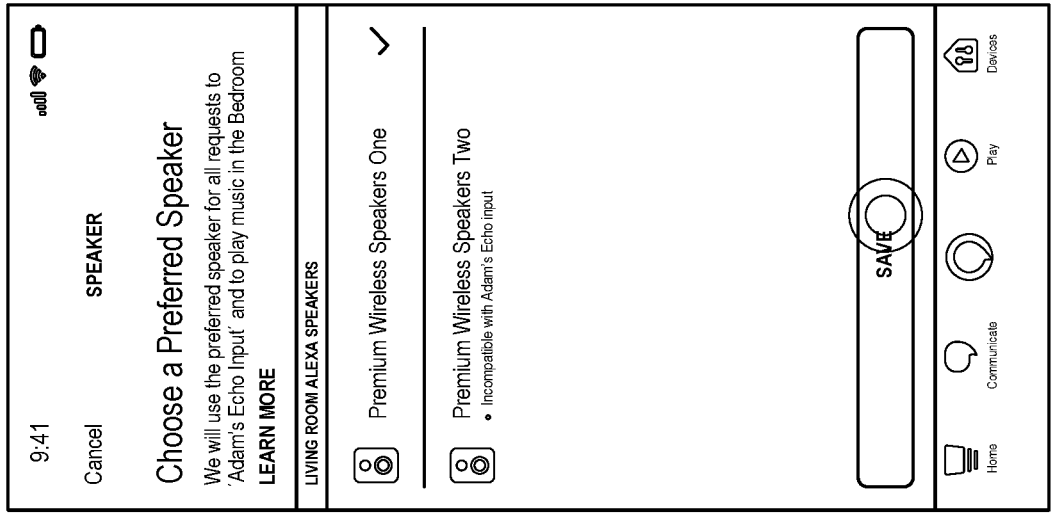

The system(s) 120 may determine that Tyrion's Echo Input is not assigned to a space yet, and then displays the user interface screen of FIG. 9D to enable the user to assign a space to Tyrion's Echo Input. As shown in FIG. 9D, the system(s) 120 may display the spaces already defined by the user in his profile, such as, living room and bedroom. The system(s) 120 may also display other common options for spaces, such as kitchen, master bedroom and den, for the user to create a new space to assign to Tyrion's Echo Input. As shown in FIG. 9D, the user may select living room as the space to assign to the source device Tyrion's Echo Input, and FIG. 9E shows the user interface screen confirming the user's selection. The user may select "NEXT" to continue. FIG. 9F shows a user interface screen displaying the output devices/speakers associated with the living room space that the user can choose as a preferred speaker. As shown in 9F, the system(s) 120 informs the user that the "Sonos Play" is incompatible with the Tyrion's Echo Input (for example, because the Sonos Play cannot output TTS generated synthesized speech). The user may select the "Sonos One" as the preferred speaker, and may select "SAVE" as shown in FIG. 9G. FIG. 9H shows a user interface screen listing the devices associated with the living room space, and confirming that the system will use the living room's preferred speaker Sonos One for requests received by Tyrion's Echo Input. FIG. 9I shows a user interface displaying the device settings for Tyrion's Echo Input showing that the connected devices configuration is set to using the preferred speaker Sonos One in the living room. In this manner, a user can assign a space to a source device and configure the system to use a preferred output device in the space for inputs received by the source device.

Figure 10:
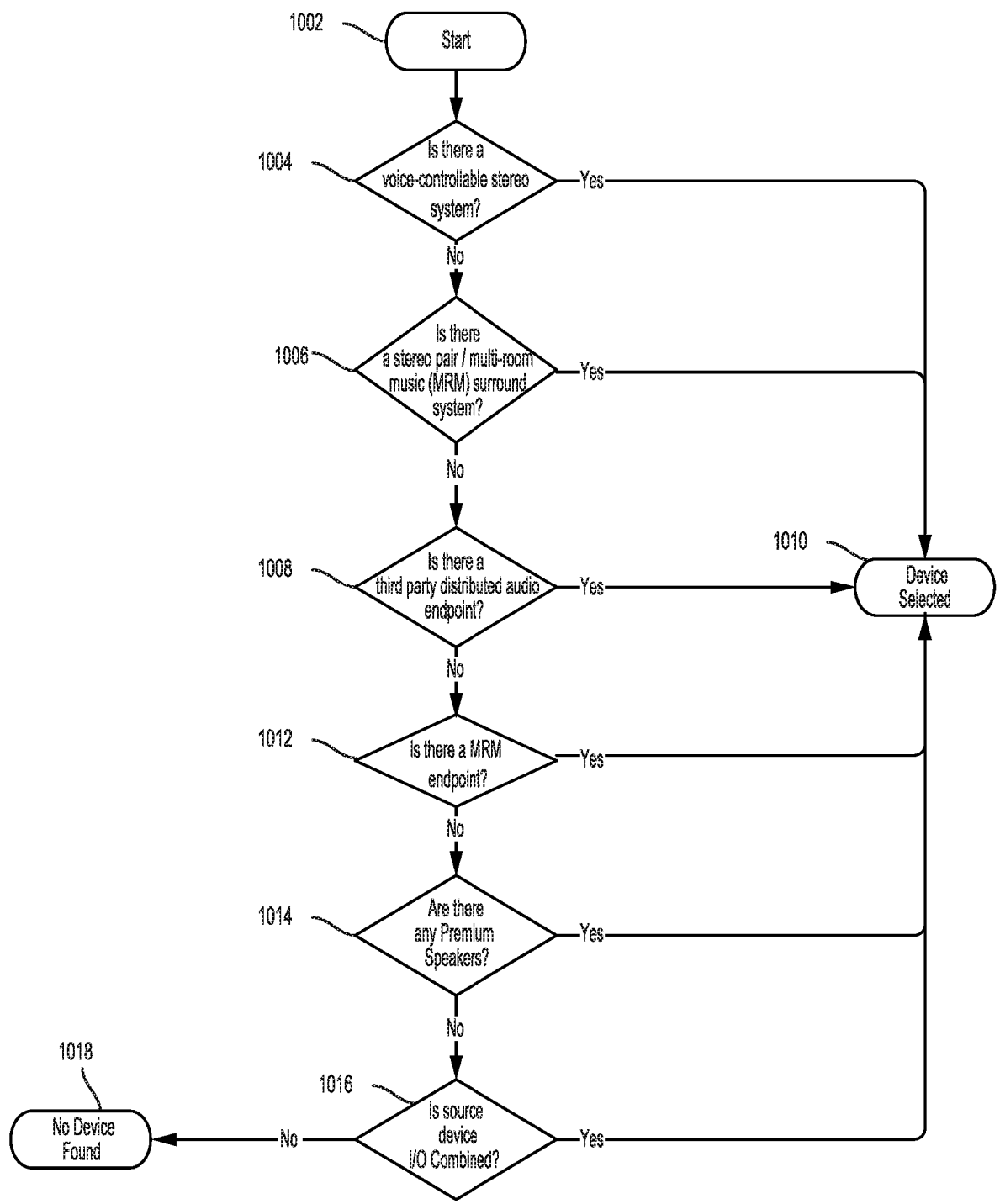
FIG. 10 is a flowchart illustrating a process to select the best audio output device based on a device seniority or hierarchy, in accordance with embodiments of the present disclosure.

FIG. 10 illustrates a flowchart to select the best audio output device based on a device seniority or hierarchy. The device's seniority may be based on the device's output quality, the device manufacturer, etc. Although the flowchart of FIG. 10 relates to speakers, it should be understood that a similar seniority or hierarchy configuration can be applied to other types of output devices to determine the best output device. As used herein, first-party system(s), first-party speaker(s), first-party device(s) or derivatives thereof refers to systems/devices manufactured and/or developed by the same entity as the speech processing system described in relation to FIG. 18. For example, the first-party may be Amazon, Inc., the speech processing system may be Alexa, and the first-party systems/devices may be Amazon devices such as an Echo Show, Echo Input, Echo Link, Fire TV, etc. As used herein, third-party system(s), third-party speaker(s), third-party device(s) or derivatives thereof refers to systems/devices manufactured and/or developed by an entity other than the speech processing system. For example, third party systems/devices may be non-Amazon devices. Some of these third-party systems/devices may be capable of integrating with the speech processing system described herein.

When the user configures the system to select the best speaker for a source device, the system(s) 120 may select the best device according to the flowchart illustrated in FIG. 10. The process starts at step 1002. At step 1004, the system(s) 120 determines if there is a voice-controllable stereo system/speakers (in some cases a first-party system; e.g., an Echo Link Amp or Echo Link) associated with the user profile and assigned to the space that the source device is assigned to. If there is such a device, then it is selected and the process proceeds to step 1010. At step 1010, the system(s) 120 sends output data to the selected device.

If an Echo Link Amp or Echo Link is not assigned to the space, then at step 1006 the system(s) 120 determines if there is a stereo pair or multi-room music (MRM) surround system assigned to the space of the source device. If there is such a device, then it is selected and the process proceeds to step 1010. If no such device is assigned to the space, then at step 1008 the system(s) 120 determines if there is a third party distributed audio endpoint (where the third party is a manufacturer other than Amazon or other than the manufacturer of the source device). If there is such a device, then it is selected and the process proceeds to step 1010. If no such device is assigned to the space, then at step 1012 the system(s) 120 determines if there is a MRM endpoint assigned to the space of the source device. If there is such a device, then it is selected and the process proceeds to step 1010. If no such device is assigned to the space, then at step 1014 the system(s) 120 determines if there are any premium speakers assigned to the space. Premium speakers may refer to high quality or high value speakers that may perform at an above-average quality. The quality of the speakers may be based on the frequency response, sensitivity, impedance, signal-to-noise ratio, power handling, speaker size and other parameters associated with the speaker. If there is such a device, then it is selected and the process proceeds to step 1010. If no such device is assigned to the space, then at step 1016 the system(s) 120 determines if the source device is a combined I/O device. If the source device is combined I/O device, then it is selected as the output device for step 1010. If the source device is an input only device, then the system(s) 120 determines at step 1018 that no device is found within the space to present the output to the user.

A MRM system may be configured to output multi-room audio/music enabling the ability to listen to audio in several rooms. Depending on the system configuration, a user can play different songs in different rooms at the same time, the same music in all rooms, or just a couple of rooms simultaneously.

Figure 11:
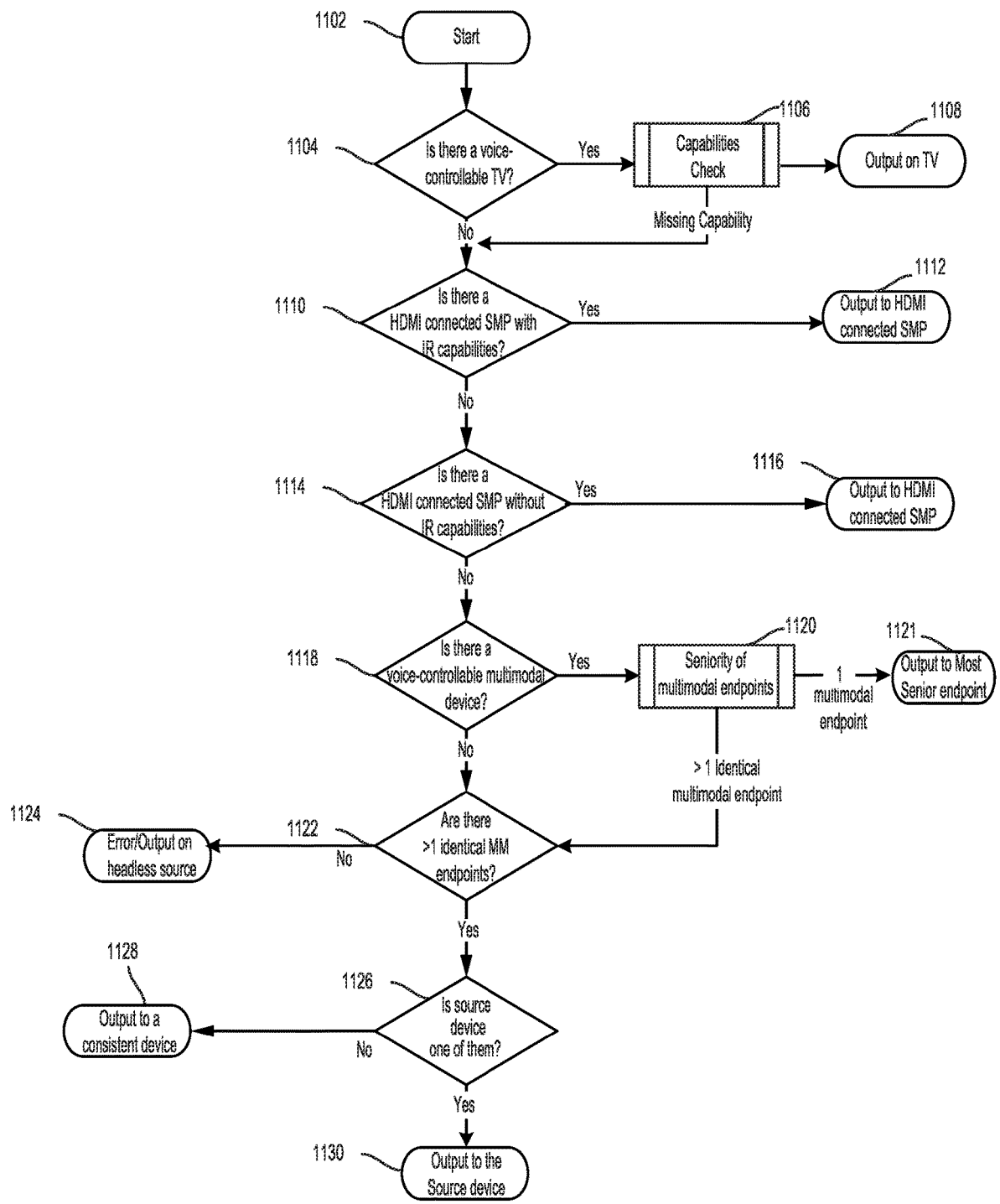
FIG. 11 is a flowchart illustrating a process to select the best visual output device based on a device seniority or hierarchy, in accordance with embodiments of the present disclosure.

FIG. 11 illustrates a flowchart to select the best visual output device based on a device seniority or hierarchy. The device's seniority may be based on the device's output quality, the device manufacturer, etc. Although the flowchart of FIG. 11 relates to devices with displays, it should be understood that a similar seniority or hierarchy configuration can be applied to other types of output devices to determine the best output device.

When the user configures the system to select the best visual output device for a source device, the system(s) 120 may select the best device according to the flowchart illustrated in FIG. 11. The process starts at step 1102. At step 1104, the system(s) 120 determines if there is a voice-controllable TV (e.g., an Alexa integrated smart TV, Fire TV, etc.) assigned to the same space as the source device. The system(s) 120 may also check if the TV is on or whether the user has granted permission to turn on the TV to present an output in response to receiving a request at the source device. If there is such a device, the system(s) 120, at step 1106, performs a capabilities check with respect to the intent of the user request. The system(s) 120 checks to ensure that the voice-controllable TV is capable of presenting an output corresponding to the user request based on the intent of the user request. For example, if the user request is to view video data captured by a home security system, some voice-controllable TVs are not capable of presenting such video data due to system configurations. In that case, the system(s) 120 performs the steps below to determine another suitable/best visual output device to respond to the user. If the capabilities are determined to be compatible, then the system(s) 120 sends the output to the TV at step 1108. If the TV is not capable of presenting the output in response to the user intent, then the system(s) 120 proceeds to step 1110.

If there is no Alexa integrated TV assigned to the space, then at step 1110 the system(s) 120 determines if there is a HDMI connected streaming media player (SMP) with infrared (IR) capabilities assigned to the space. If there is such as a device, then at step 1112 the system(s) 120 sends the output to the HDMI connected SMP device. If there is no such device, then at step 1114 the system(s) 120 determines if there is an HDMI connected SMP without IR capabilities. If there is such a device, then at step 1116 the system(s) 120 sends the output that HDMI connected SMP device.

If there is no SMP device, then at step 1118 the system(s) 120 determines if there is a voice-controllable multimodal device (e.g., an Alexa integrated multimodal device). If there are no voice-controllable multimodal devices, then the process proceeds to step 1122. As used herein, a multimodal device refers to a device capable of receiving input and presenting output via a variety of interfaces. For example, a multimodal device (such as an Echo Show) may be capable of receiving touch inputs, voice inputs, text inputs, etc., and may be capable of presenting audio outputs, visual outputs including video contents, graphics, interactive visuals, etc. If there is such a device, then at step 1120 the system(s) 120 executes the process for determining seniority of voice-controllable multimodal endpoints. If there is only one voice-controllable multimodal endpoint of its kind, then at step 1121 the system sends the output to that endpoint. If there are multiple multimodal endpoints that are identical then the process continues to step 1122.

At step 1120, in determining seniority of the multimodal endpoints, the system may determine seniority based on a screen size of the multimodal device, the number of interfaces capable of presenting an output, and other endpoint capabilities. For example, the voice-controllable multimodal endpoints available in the space may include an Echo Show 5 with a 5.5 inch screen, an Echo Show 8 with an 8 inch high-definition screen, an Echo Show second generation with a 10.1 inch high-definition screen and premium speakers, etc. At step 1120, the system may determine that the Echo Show second generation is senior (otherwise ranked higher) than the other devices based on its larger screen size, high-definition screen output and premium speakers for audio output. In that case, the system may send the output to the Echo Show second generation.

If the space includes an identical endpoint that is determined to be senior to the other devices, for example, the space includes a second Echo Show second generation, then from step 1120 the process continues to step 1122.

At step 1122, the system(s) 120 determines if there are two identical or similar multimodal devices, in terms of device capabilities, output quality, etc., assigned to the space. That is, continuing with the above example, the system determines if the space includes a second Echo Show second generation. If there no identical multimodal devices, then at step 1124 the system(s) 120 outputs an error or sends the output to a headless device.

If there are two or more identical multimodal devices, then at step 1126 the system(s) 120 determines if the source device is one of them. If the source device is one of them, then at step 1130 the system(s) 120 sends the output to the source device. If the source device is not one of them, then at step 1128 the system(s) 120 sends the output to a consistent device. In some embodiments, the system may select one of the identical multimodal endpoint based on the corresponding device identifiers (e.g., the lowest device identifier number or the highest device identifier), and consistently select that endpoint device when processing at step 1128. In other embodiments, the system may select one of the identical multimodal endpoint based on the user preference, the most recently used device, the most often used device, etc.

Figure 12:
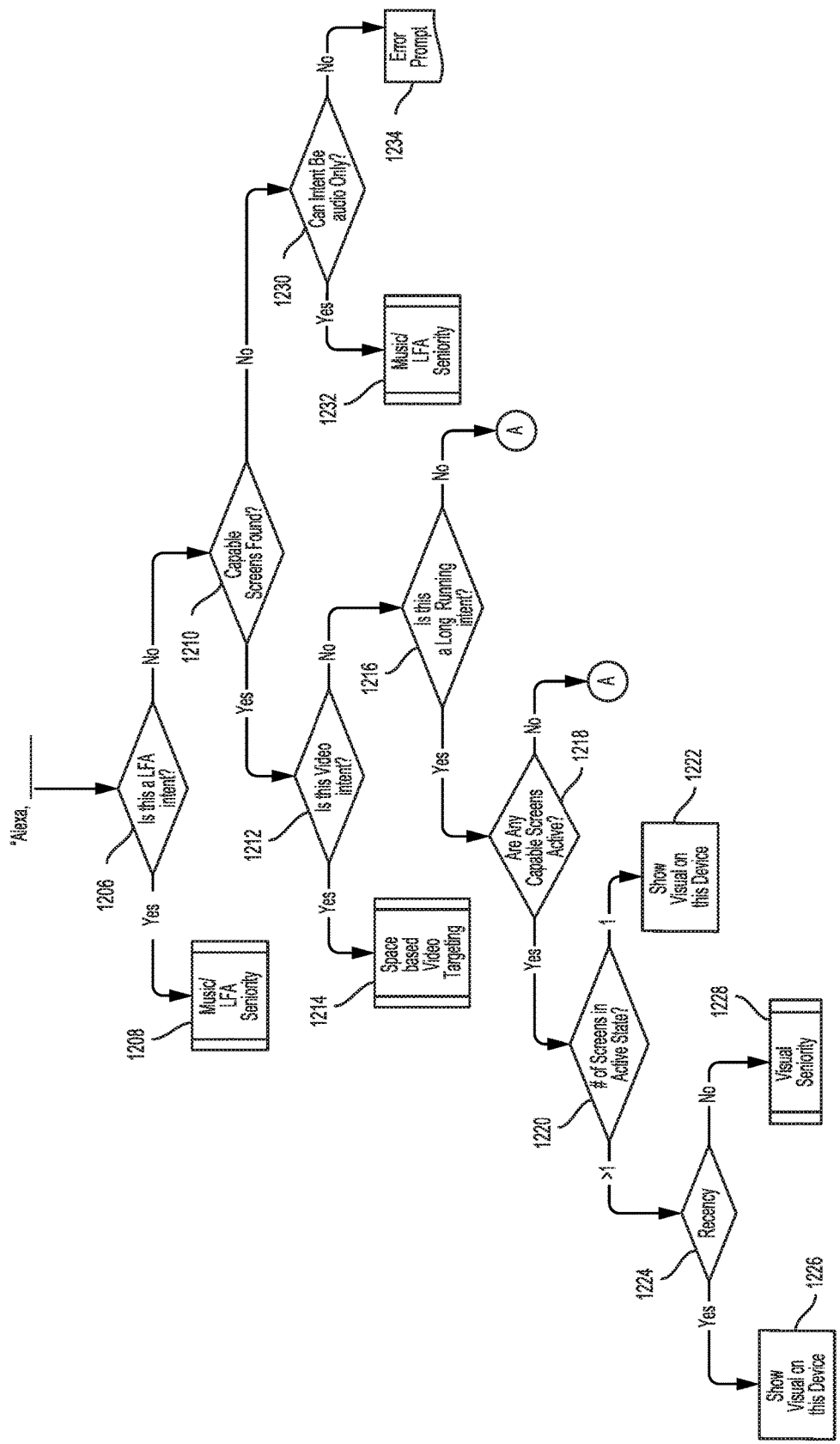
FIG. 12 illustrates a flowchart for initiating the process of selecting an output device other than the source/input device, in accordance with embodiments of the present disclosure.

FIG. 12 illustrates a flowchart for an initiation process for when a user is opt-in for selecting an output device other than the source/input device. The process starts with the system(s) 120 receiving a user request "Alexa,_____." At step 1206 the system(s) 120 determines if the intent corresponding to the user request is to receive long-form audio content (LFA). As used herein, long-form audio content refers to audio that may be more than a few seconds long, and may correspond to a song, a movie, a podcast, a radio station, a TV show, etc.

If the intent is to receive long-form audio content, then at step 1208 the system(s) 120 follows the process for determining an audio output device seniority of FIG. 10. If the intent is not related to receiving long-form audio content, then at step 1210 the system(s) 120 determines if a device with display screen capabilities is associated with the space. If there is no such device, then the system(s) 120 at step 1230 determine if the intent corresponding to the user request is to receive audio only. If yes, then at step 1232 the system(s) 120 follows the process for determining an audio output device seniority of FIG. 10. If no, then at step 1234 the system(s) 120 outputs an error prompt, for example, that the output cannot be presented to the user using the devices associated with the space.

If at step 1210 the system(s) 120 finds a device with display screen capabilities, then at step 1212 the system(s) 120 determines if the intent corresponding to the user request is to receive video. If yes, then at step 1214 the system(s) 120 follows the video targeting process of FIG. 16. If no, then at step 1216 the system(s) 120 determines if the intent is to receive a long-running output (an output being presented for more than a few minutes, such as a movie, a TV show, a reading a book, etc.). If the intent is not to receive a long-running output, then the system(s) 120 proceeds to 'A' shown in FIG. 13.

If the intent is to receive long-running output, then at step 1218 the system(s) 120 determines if any devices with capable display screens are active (e.g., display screen is on, there is power to the device/screen, etc.). If there no active screens, then the system(s) 120 proceeds to 'A' shown in FIG. 13. If there are one or more active screens, then at step 1220 the system(s) 120 determines how many screens are active. If there is one screen active, then at step 1222 the system(s) 120 sends the visual output corresponding to the user request to the device with the active screen to enable it to output/show. If there are more than one active screens, then at step 1224 the system(s) 120 determines if any of them was recently used (e.g., user recently interacted with). If yes, then at step 1226 the system(s) 120 sends the visual output corresponding to the user request to the device with the active screen to enable it to output/show. If there no active screen was recently used, then the system(s) 120, at step 1228, follows the process for determining a visual output device seniority of FIG. 11.

Figure 13:
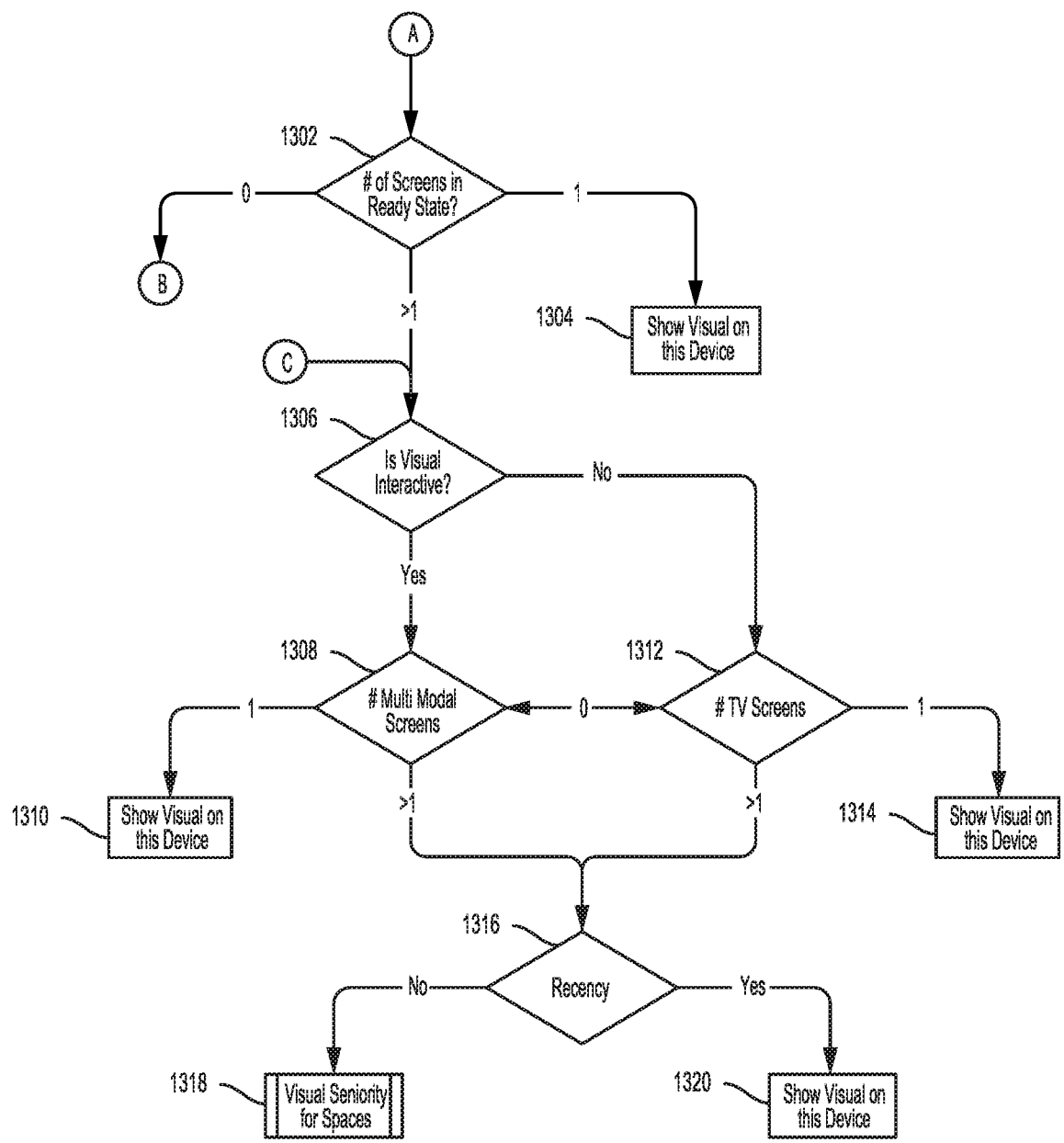
FIG. 13 illustrates a flowchart of the process continuing the initiation process of FIG. 12.

FIG. 13 illustrates a flowchart of the process continuing the initiation process of FIG. 12. The process of FIG. 12 that ends in 'A' continues at step 1302, where the system(s) 120 determines the number of screens that are in 'ready state.' A screen may be in a ready state if the device is on, if there is power being supplied to the device, the user has logged in with any necessary credentials, and the like. If there are no screens in the ready state, then the system(s) 120 proceeds to 'B' of FIG. 14. If there is one screen in the ready state, then at step 1304 the system(s) 120 sends the visual output corresponding to the user request to the device with the ready-state screen to enable it to output/show.

If there are more one screens in the ready state, then at step XMM06 the system(s) 120 determines if the visual output corresponding to the user request is interactive. If the visual output is not interactive, then at step 1312 the system(s) 120 determines the number of TV screens associated with the space. A TV screen may be a device capable of displaying video or visual output without receiving input/interactions with respect to the output via the screen for example. If there is one TV screen in the space, then at step 1314 the system(s) 120 sends the visual output corresponding to the user request to the TV to enable it to output/show.

If there are more than one TV screens, then the process proceeds to step 1316. If there are no TV screens in the space, then the system(s) 120 determines if the visual output can be provided at a multi-modal screen (step 1308)

If the visual output is interactive, then at step 1308 the system(s) 120 determines the number of multi-modal screens associated with the space. If there is one multi-modal screen, then at step 1310 the system(s) 120 sends the visual output corresponding to the user request to the multi-modal device to enable it to output/show. If there are no multi-modal screens in the space, then the system(s) 120 determines if the visual output can be provided at a TV screen (step 1312). If there are more than one multi-modal screen, then the process proceeds to step 1316.

At step 1316 the system(s) 120 determines if any of the screens (TV or another multimodal output device) was used recently. If yes, then at step 1320 the system(s) 120 sends the visual output corresponding to the user request to the recently used screen to enable it to output/show. If no screens were recently used, then the system(s) 120, at step 1318, follows the process for determining a visual output device seniority of FIG. 11.

Figure 14:
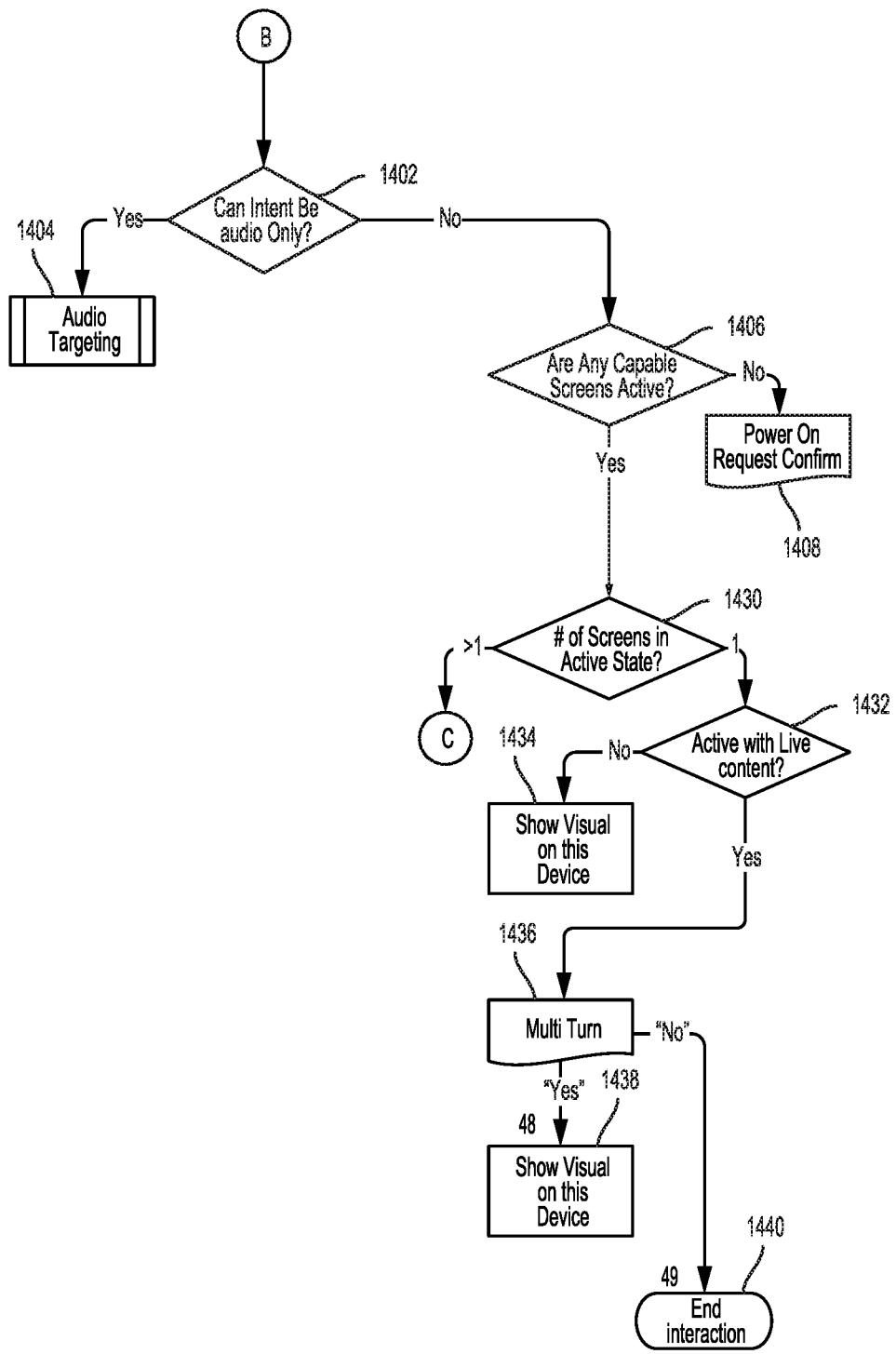
FIG. 14 illustrates a flowchart of the process continuing the initiation process of FIG. 13.

FIG. 14 illustrates a flowchart of the process continuing the initiation process of FIG. 13. The process of FIG. 13 that ends in 'B' continues at step 1402, where the system(s) 120 determines if the intent of the user request is to receive audio only. If yes, then at step 1214 the system(s) 120 follows the video targeting process of FIG. 16. If no, then at step 1406 the system(s) 120 determines if there are any active devices with screens capable of presenting the output. If there are no such devices, then at step 1408 the system(s) 120 causes the source device to confirm with the user that the system can turn on power to a capable device, or asks the user to turn on the power to a capable device.

If there is at least one capable screen active, then at step 1430 the system(s) 120 determines the number of active screens. If there are more than one screens active, then the process proceeds to 'C' of FIG. 13 (at step 1306). If there is only one screen active, then the system(s) 120 determines, at step 1432, if the active screen is presently outputting content. If no, then at step 1434 the system(s) 120 sends the visual output corresponding to the user request to the active screen to enable it to output/show.

If the only active screen is presently outputting content, then the system(s) 120, at step 1436, may determine if the content is a multi-turn interaction (e.g., the user is engaged in a multi-turn conversation with the device). If yes, then at step 1438 the system(s) 120 sends the visual output corresponding to the user request to the device to enable it to output/show, for example, between turns without interrupting the user or the system's dialog output. If the content is not a multi-turn interaction, then the system(s) 120 causes the session/interaction corresponding to the user request to end at step 1440.

Figure 15:
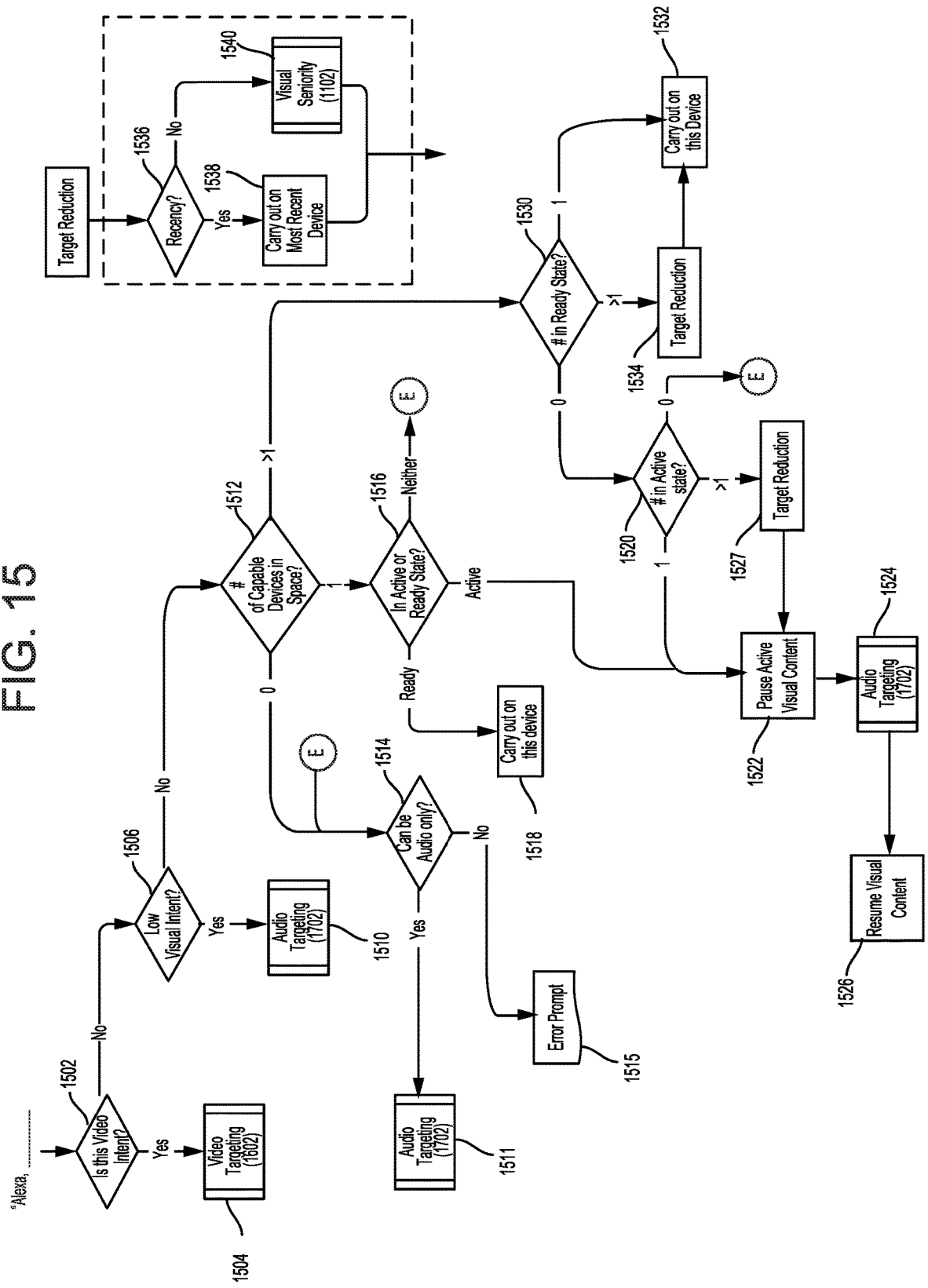
FIG. 15 illustrates a flowchart for another process of selecting an output device other than the source/input device, in accordance with embodiments of the present disclosure.

FIG. 15 illustrates a flowchart of another process for selecting an output device for a request received at a source device within a space. FIG. 15 illustrates another embodiment of the process illustrated in FIG. 12. At step 1502, the system(s) 120 determines if the intent of the user request is to receive video content. If yes, then at step 1504 the system(s) 120 follows the video targeting process of FIG. 16. If no, then at step 1506 the system(s) 120 determine if the intent of the user request is to receive low visual content. As used herein, low visual content may refer to a user request that can be fulfilled without providing video content, and with limited visual content. In some embodiments, certain intents may be identified as low visual intents, and the system(s) 120 may not determine additional visual content that can enhance the output responsive to the user request. If yes, then the system(s) 120 follows the audio targeting process of FIG. 17. If no, then at step 1512 determines the number of devices capable of outputting visual content associated with the space. Visual content may include content that is displayed to the user and the user is able to interact with it, via a touch-screen, keyboard, mouse, voice input, or other forms of interactions.

If there are no devices capable of outputting visual content, then at step 1514 the system(s) 120 determines if the user request can be fulfilled with audio content only. If no, then at step 1515 the system(s) 120 outputs an error prompt, for example, that the output cannot be presented to the user using the devices associated with the space. If the user request can be fulfilled with audio content only, then the system(s) 120 at step 1511 follows the audio targeting process of FIG. 17.

If there is one device capable of outputting visual content, then at step 1516 the system(s) 120 determines if the device is active or in a ready-state. If the device is in ready state, then at step 1518 the system(s) 120 sends the visual content to the device to enable it to output to the user. If the device is not active state or in ready-state, then the system(s) 120 proceeds to 'E', which leads to step 1506 to determine if the user request can be fulfilled with audio content only.

If the device is in active state, then at step 1522 the system(s) 120 pauses the active visual content being outputted at the device. As used herein, a device may be in active state if it is presently outputting content. After pausing the active visual content, the system(s) 120 performs at step 1524 the audio targeting process of FIG. 17 to determine the best audio output device in the space to present the audio content associated with the visual content in response to the user request. The system(s) 120 sends the output responsive to the user request to the paused visual output device and the best audio output device. After the output is presented (and the user interaction with respect to the user request has ended), the system(s) 120 at step 1526 resumes the visual content at the visual output device.

If, at step 1512, more than one device in the space is capable of outputting visual content, then at step 1530 the system(s) 120 determines how many of them are in ready-state. If only device is in ready-state, then at step 1532 the system(s) 120 sends the visual content to the device to enable it to output to the user. If more than one device is in ready-state, then the system(s) 120 performs the target reduction process at step 1534. At step 1532, the system(s) 120 sends the visual content to the device selected based on a target reduction process (described below) to enable it to present the output to the user. If none of the devices are in ready-state, then the system(s) 120 determines at step 1520 if any of them are in active state. If only one device is in active state, then the system(s) 120 proceeds to step 1522 (described above). If more than one device is in active state, then at step 1527 the system(s) 120 performs the target reduction process, and using the device selected per the target reduction process, proceeds to step 1522. If none of the devices are in active state, then the system(s) 120 proceeds to 'E', which leads to step 1506 where the system(s) 120 determines if the user request can be fulfilled using audio content only.

In the target reduction process (shown in the upper right corner), the system(s) 120, at step 1536, determines if any of the devices were recently used. If yes, then at step 1538 the system(s) 120 selects the most recently used device to output the visual content. If none of the devices were recently used, then the system(s) 120, at step 1540 follows the process to determine visual output devices seniority as illustrated in FIG. 11. The output of the target reduction process is a selection of a visual output device, and the system(s) 120 may perform further steps using the selected visual output device as described above.

Figure 16:
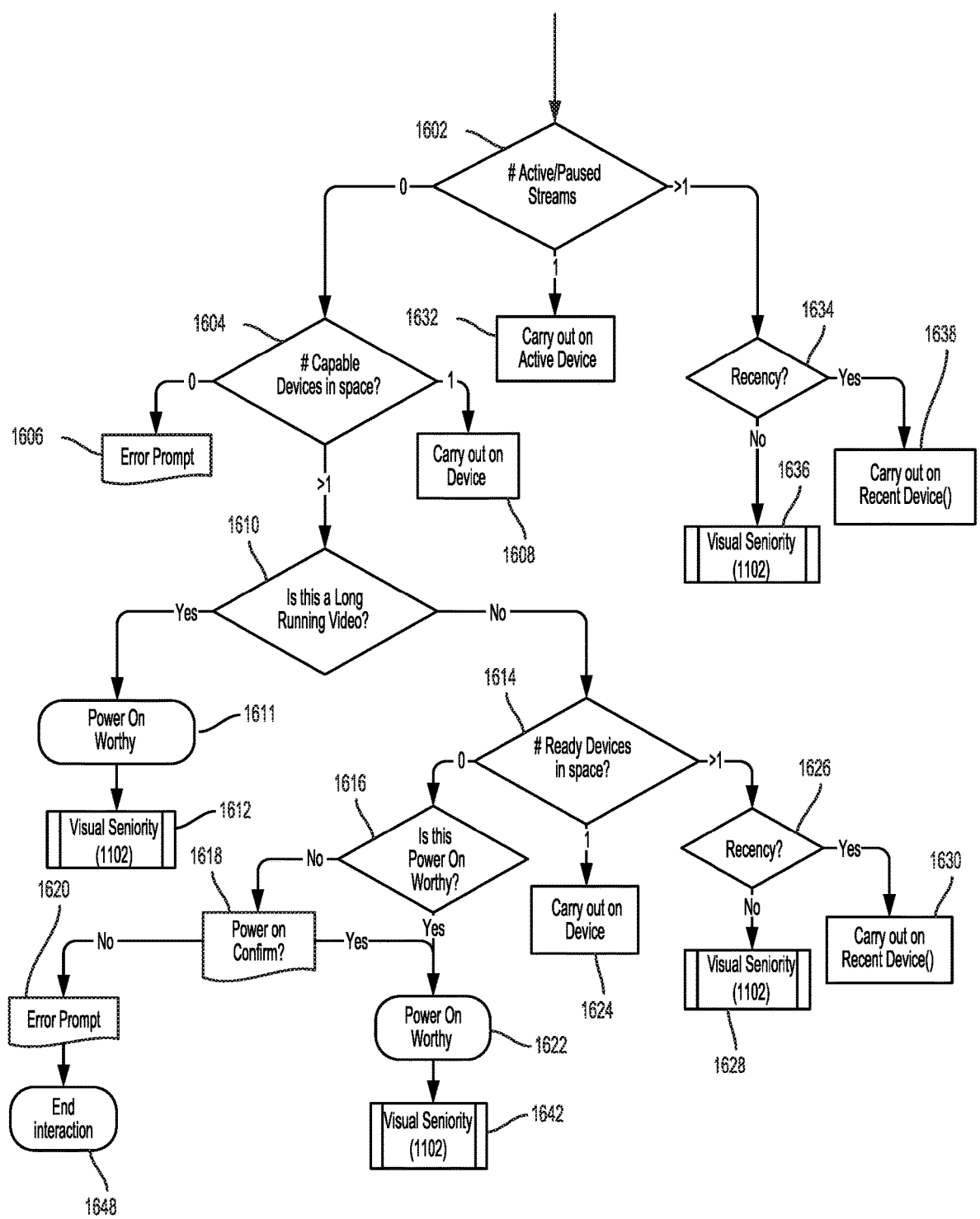
FIG. 16 illustrates a process for selecting the best video output device, in accordance with embodiments of the present disclosure.

FIG. 16 illustrates a process for selecting the best video output device, which may be initiated at step 1508. At step 1602, the system(s) 120 determines the number of active or paused content streams. If there are zero active/paused streams, then at step 1604 the system(s) 120 determines the number of capable devices in the same space as the source device. If there are no capable devices, then the system(s) 120 at step 1606 outputs an error prompt, for example, that the output cannot be presented to the user using the devices associated with the space. If there is one capable device in the space, then the system(s) 120 at step 1608 sends the output to that device to enable it to present it to the user.

If there are more than one capable devices in the space, then at step 1610 the system(s) 120 determines if the output is a long-running video (such as, a movie, TV show, etc.). If yes, then at step 1611 the system(s) 120 determines if the output is "power on worthy," and proceeds to the visual output seniority process of FIG. 11 at step 1612. The system(s) 120 may determine if the output is power on worthy based on the intent of the user request. If the user input explicitly requests for video or visual content, then the system(s) 120 determine the output to be power on worthy. For example, if the user request is "show me today's weather" or "play the movie Lion King" then the system(s) 120 determines that the responsive output is power on worthy. As another example, if the user request is "what is today's weather," then the system(s) 120 may determine that the output is not power on worthy, even though it may be beneficial to the user to view content related to the weather, it is not worth turning on powered off devices. As such, in some cases the system(s) 120 may determine to turn on powered-off devices only when the user explicitly requests to view output content or the user request intent relates to displaying visual content.

If the output is not a long-running video, then at step 1614 the system(s) 120 determines the number of devices in the space that are in ready-state. If there are no devices in ready-state, then at step 1616 the system(s) 120 determines if the output is worth turning on the power of a device. If no, then the process proceeds to step 1618. If yes, then at step 1622 the system(s) 120 turns on the power and proceeds to the visual output device seniority process of FIG. 11 at step 1642.

At step 1618, the system(s) 120 causes the source device to confirm with the user that the system can turn on power to a capable device, or asks the user to turn on the power to a capable device. If the power is not turned on for the device, or the user denies the request to power the device, then the system(s) 120 outputs an error prompt at step 1620, for example, that the output cannot be presented to the user using the devices associated with the space, and the system(s) 120 causes the interaction to end at step 1648. If the power is turned on for the device, then the process proceeds to step 1622.

If at step 1614 the system(s) 120 determines that only one capable device in the space is in ready-state, then at step 1624 the system(s) 120 sends the output to that device to enable it to output to the user. If at step 1614 the system(s) 120 determines that there are more than one capable devices in the space in ready-state, then at step 1626 the system(s) 120 determines if any of them were recently used. If yes, then at step 1630 the system(s) 120 sends the output to the recently used device. If no, then at step 1628 the system(s) 120 executes the seniority visual output device flow of FIG. 11.

If at step 1602, the system(s) 120 determines that there is one device with an active/paused content stream, then the system(s) 120 sends the output to that device at step 1632 to enable it to present the output to the user. If at step 1602, the system(s) 120 determines that there are more than one devices with an active/paused content stream, then the process proceeds to step 1634. At step 1634 the system(s) 120 determines if any of the active/paused devices were recently used. If yes, then at step 1638 the system(s) 120 sends the output to the most recently used device. If no, then at step 1636 the system(s) 120 executes the seniority visual output device flow of FIG. 11.

Figure 17:
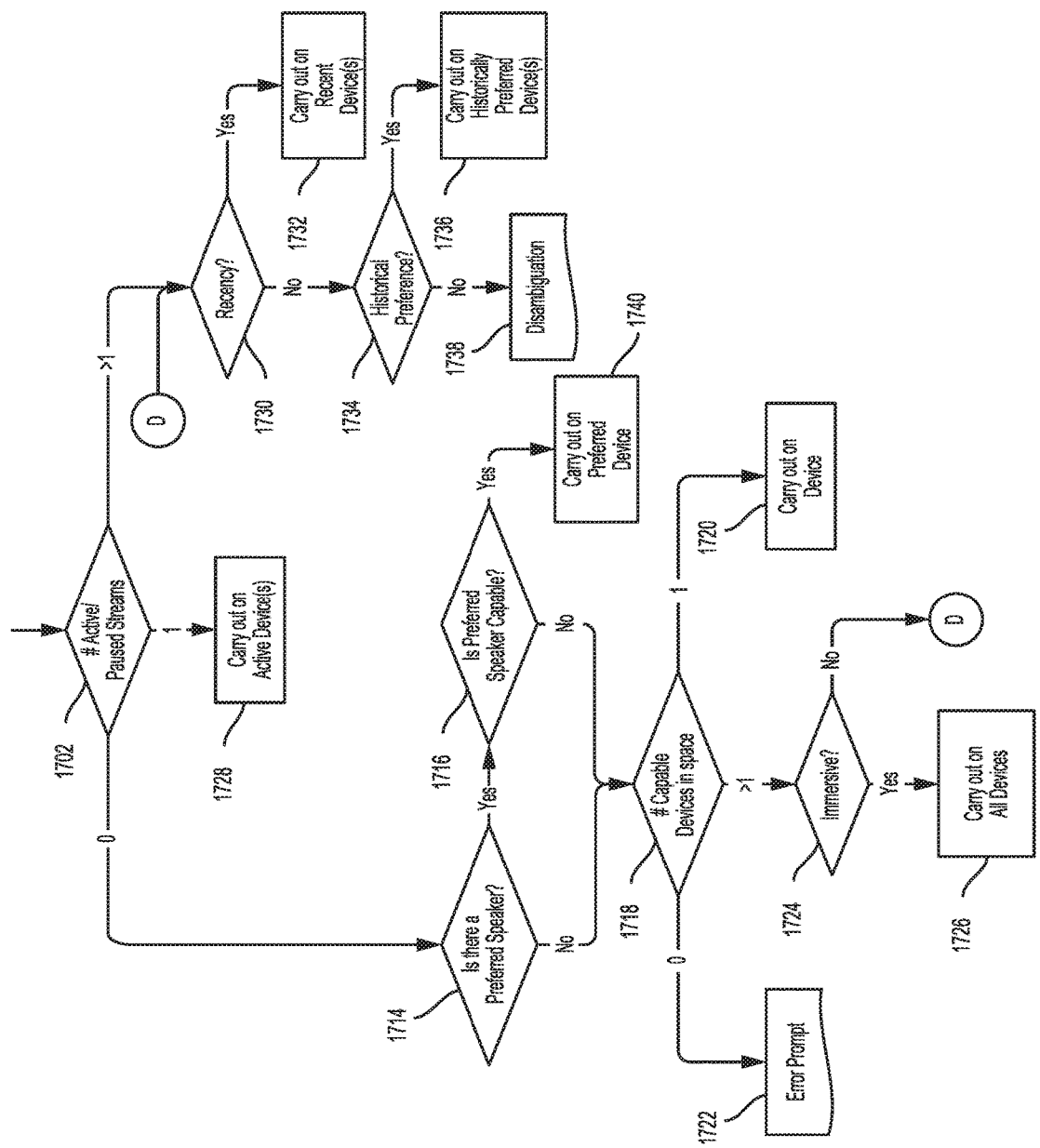
FIG. 17 illustrates a process for selecting the best audio output device, in accordance with embodiments of the present disclosure.

FIG. 17 illustrates a process for selecting the best audio output device, which may be initiated at step 1504. At step 1702, the system(s) 120 determines the number of active or paused content streams. If there are zero active/paused streams, then at step 1714 the system(s) 120 determines if there is a preferred speaker assigned to the space. If yes, then the system(s) 120 determines at step 1716 if the preferred speaker is compatible and capable of presenting the output. If yes, then the system(s) 120 at step 1740 sends the audio output to the preferred speaker to enable it to present it to the user. If the preferred speaker is incompatible, then the process proceeds to step 1718. If there are no preferred speakers assigned to the space (determined at step 1714) then the process proceeds to step 1718.

At step 1718, the system(s) 120 determines the number of devices capable of outputting the audio output. If there are no such devices, then at step 1722 the system(s) 120 outputs an error prompt, for example, that the output cannot be presented to the user using the devices associated with the space. If there is one capable device in the space, then at step 1720 the system(s) 120 sends the audio output to that device to enable it to present it to the user. If there are more than one capable devices in the space, then at step 1724 the system(s) 120 determines if the output is immersive. An immersive output may include music, audio for a movie or TV show, and the like. An immersive output may be audio content that is better experienced by a user when outputted by multiple devices, so to present a surround sound effect. If yes, then the system(s) 120 at step 1726 sends the audio output to all the capable devices to output simultaneously. If no, then the system(s) 120 proceeds to 'D' at step 1730.

If at step 1702, the system(s) 120 determines that there is one device with an active/paused content stream, then the system(s) 120 sends the output to that device at step 1728 to enable it to present the output to the user. If at step 1702, the system(s) 120 determines that there are more than one devices with an active/paused content stream, then the process proceeds to step 1730. At step 1730 the system(s) 120 determines if any of the devices with active/paused content were recently used. If yes, then at step 1732 the system(s) 120 sends the audio output to the recently used device(s) for output. If no, then at step 1734 the system(s) 120 determines if there is a historical preference of which output device the user frequently uses. If yes, then at step 1736 the system(s) 120 sends the audio output to the historically preferred device(s) for output. If no, then at step 1738 the system(s) 120 performs disambiguation by asking the user, via the source device, to select an output device.

Figure 18:
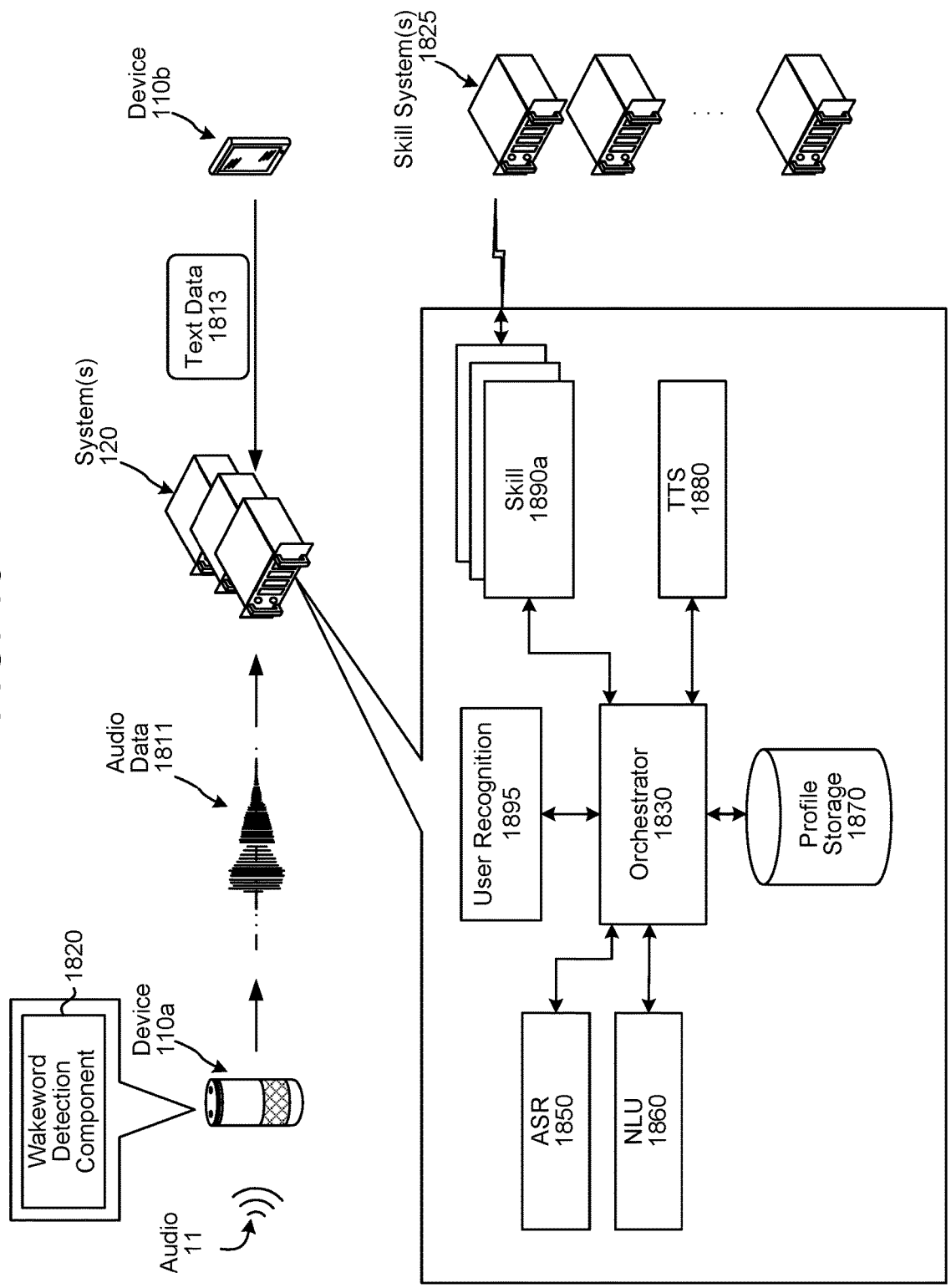
FIG. 18 is a conceptual diagram of components of a system for processing user inputs, in accordance with embodiments of the present disclosure.

FIG. 18 illustrates various runtime components of the system(s) 120, for example to process a user input as discussed above. Communication between various components may occur directly or across a network(s) 199.

An audio capture component(s), such as a microphone or array of microphones of the device 110*a*, captures audio 11. The device 110*a* processes audio data, representing the audio 11, to determine whether speech is detected. The device 110*a* may use various techniques to determine whether audio data includes speech. In some examples, the device 110*a* may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110*a* may implement a limited classifier configured to distinguish speech from background noise. The classifier may be implemented by techniques such as linear classifiers, support vector machines, and decision trees. In still other examples, the device 110*a* may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110*a* may use a wakeword detection component 1820 to perform wakeword detection to determine when a user intends to speak an input to the system(s) 120. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 1820 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1820 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 1811, representing the audio 11, to the system(s) 120. The audio data 1811 may include data corresponding to the wakeword, or the device 110a may remove the portion of the audio corresponding to the wakeword prior to sending the audio data 1811 to the system(s) 120.

An orchestrator component 1830 may receive the audio data 1811. The orchestrator component 1830 may include memory and logic that enables the orchestrator component 1830 to transmit various pieces and forms of data to various components of the system, as well as perform other operations.

The orchestrator component 1830 sends the audio data 1811 to an ASR component 1850. The ASR component 1850 transcribes the audio data 1811 into text data. The text data output by the ASR component 1850 represents one or more than one (e.g., in the form of an n-best list) ASR hypotheses representing speech represented in the audio data 1811. The ASR component 1850 interprets the speech in the audio data 1811 based on a similarity between the audio data 1811 and pre-established language models. For example, the ASR component 1850 may compare the audio data 1811 with models for sounds (e.g., subword units, such as phonemes, etc.) and sequences of sounds to identify words that match the sequence of sounds of the speech represented in the audio data 1811. The ASR component 1850 outputs text data representing one or more ASR hypotheses. The text data output by the ASR component 1850 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The device 110b may receive a text-based user input. The device 110b may generate text data 1813 representing the text-based user input. The device 110a may send the text data 1813 to the system(s) 120. The orchestrator component 1830 may receive the text data 1813.

The orchestrator component 1830 may send text data (e.g., text data output by the ASR component 1850 or the received text data 1813) to an NLU component 1860.

The NLU component 1860, implementing NLU models, attempts to make a semantic interpretation of the phrase(s) or statement(s) represented in the received text data. That is, the NLU component 1860 determines one or more meanings associated with the phrase(s) or statement(s) represented in the text data based on words represented in the text data. The NLU component 1860 determines an intent representing an action that a user desires be performed as well as pieces of the text data that allow a device (e.g., the device 110, the system(s) 120, a skill 1890, a skill system(s) 1825, etc.) to execute the intent. For example, if the text data corresponds to "play Adele music," the NLU component 1860 may determine an intent that the system(s) 120 output music and may identify "Adele" as an artist. For further example, if the text data corresponds to "what is the weather," the NLU component 1860 may determine an intent that the system(s) 120 output weather information associated with a geographic location of the device 110. In another example, if the text data corresponds to "turn off the lights," the NLU component 1860 may determine an intent that the system(s) 120 turn off lights associated with the device(s) 110 or the user(s) 5. The NLU component 1860 may output NLU results data (which may include tagged text data, indicators of intent, etc.).

As described above, the system(s) 120 may perform speech processing using two different components (e.g., the ASR component 1850 and the NLU component 1860). One skilled in the art will appreciate that the system(s) 120, in at least some implementations, may implement a spoken language understanding (SLU) component that is configured to process audio data 1811 to generate NLU results data. In such an implementation, the SLU component may implement the herein described NLU models.

In some examples, a speech-language understanding (SLU) component may be equivalent to the ASR component 1850 and the NLU component 1860. For example, the SLU component may process audio data 1811 and generate NLU data. The NLU data may include intent data and/or slot data so that directives may be determined based on the intent data and/or the slot data. While the SLU component may be equivalent to a combination of the ASR component 1850 and the NLU component 1860, the SLU component may process audio data 1811 and directly generate the NLU data, without an intermediate step of generating text data (as does the ASR component 1850). As such, the SLU component may take audio data 1811 representing speech and attempt to make a semantic interpretation of the speech. That is, the SLU component may determine a meaning associated with the speech and then implement that meaning. For example, the SLU component may interpret audio data 1811 representing speech from the user 5 in order to derive an intent or a desired action or operation from the user 5. In some examples, the SLU component outputs a most likely NLU response (e.g., hypothesis) recognized in the audio data 1811, or multiple hypotheses in the form of a lattice or an N-best list with individual hypotheses corresponding to confidence scores or other scores (such as probability scores, etc.).

The system(s) 120 may include one or more skills 1890. A "skill" may be software running on the system(s) 120 that is akin to a software application running on a traditional computing device. That is, a skill 1890 may enable the system(s) 120 to execute specific functionality in order to provide data or produce some other requested output. The system(s) 120 may be configured with more than one skill 1890. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 1890 may operate in conjunction between the system(s) 120 and other devices, such as the device 110, in order to complete certain functions. Inputs to a skill 1890 may come from speech processing interactions or through other interactions or input sources. A skill 1890 may include hardware, software, firmware, or the like that may be dedicated to a particular skill 1890 or shared among different skills 1890.

In addition or alternatively to being implemented by the system(s) 120, a skill 1890 may be implemented by a skill system(s) 1825. Such may enable a skill system(s) 1825 to execute specific functionality in order to provide data or perform some other action requested by a user.

Skills may be associated with different domains, such as smart home, music, video, flash briefing, shopping, and custom (e.g., skills not associated with any pre-configured domain).

The system(s) 120 may be configured with a single skill 1890 dedicated to interacting with more than one skill system(s) 1825.

Unless expressly stated otherwise, reference herein to a "skill," or a derivative thereof, may include a skill 1890 operated by the system(s) 120 and/or skill operated by a skill system(s) 1825. Moreover, the functionality described herein as a skill may be referred to using many different terms, such as an action, bot, app, or the like.

The system(s) 120 may include a TTS component 1880. The TTS component 1880 may generate audio data (e.g., synthesized speech) from text data using one or more different methods. Text data input to the TTS component 1880 may come from a skill 1890, the orchestrator component 1830, or another component of the system(s) 120.

In one method of synthesis called unit selection, the TTS component 1880 matches text data against a database of recorded speech. The TTS component 1880 selects matching units of recorded speech and concatenates the units together to form audio data. In another method of synthesis called parametric synthesis, the TTS component 1880 varies parameters such as frequency, volume, and noise to create audio data including an artificial speech waveform. Parametric synthesis uses a computerized voice generator, sometimes called a vocoder.

The system(s) 120 may include a user recognition component 1895 that recognizes one or more users associated with data input to the system(s) 120. The user recognition component 1895 may take as input the audio data 1811 and/or the text data 1813. The user recognition component 1895 may perform user recognition by comparing speech characteristics in the audio data 1811 to stored speech characteristics of users. The user recognition component 1895 may additionally or alternatively perform user recognition by comparing biometric data (e.g., fingerprint data, iris data, etc.), received by the system(s) 120 in correlation with a user input, to stored biometric data of users. The user recognition component 1895 may additionally or alternatively perform user recognition by comparing image data (e.g., including a representation of at least a feature of a user), received by the system(s) 120 in correlation with a user input, with stored image data including representations of features of different users. The user recognition component 1895 may perform other or additional user recognition processes, including those known in the art. For a particular user input, the user recognition component 1895 may perform processing with respect to stored data of users associated with the device 110 that captured the user input.

The user recognition component 1895 determines whether a user input originated from a particular user. For example, the user recognition component 1895 may generate a first value representing a likelihood that a user input originated from a first user, a second value representing a likelihood that the user input originated from a second user, etc. The user recognition component 1895 may also determine an overall confidence regarding the accuracy of user recognition operations.

The user recognition component 1895 may output a single user identifier corresponding to the most likely user that originated the user input. Alternatively, the user recognition component 1895 may output multiple user identifiers (e.g., in the form of an N-best list) with respective values representing likelihoods of respective users originating the user input. The output of the user recognition component 1895 may be used to inform NLU processing, processing performed by a skill 1890, as well as processing performed by other components of the system(s) 120 and/or other systems.

The system(s) 120 may include profile storage 1870. The profile storage 1870 may include a variety of information related to individual users, groups of users, devices, etc. that interact with the system(s) 120. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 1870 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the system(s) 120 with permission to allow the skill to execute with respect to the user's inputs. If a user does not enable a skill, the system(s) 120 may not permit the skill to execute with respect to the user's inputs.

The profile storage 1870 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 1870 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 19:
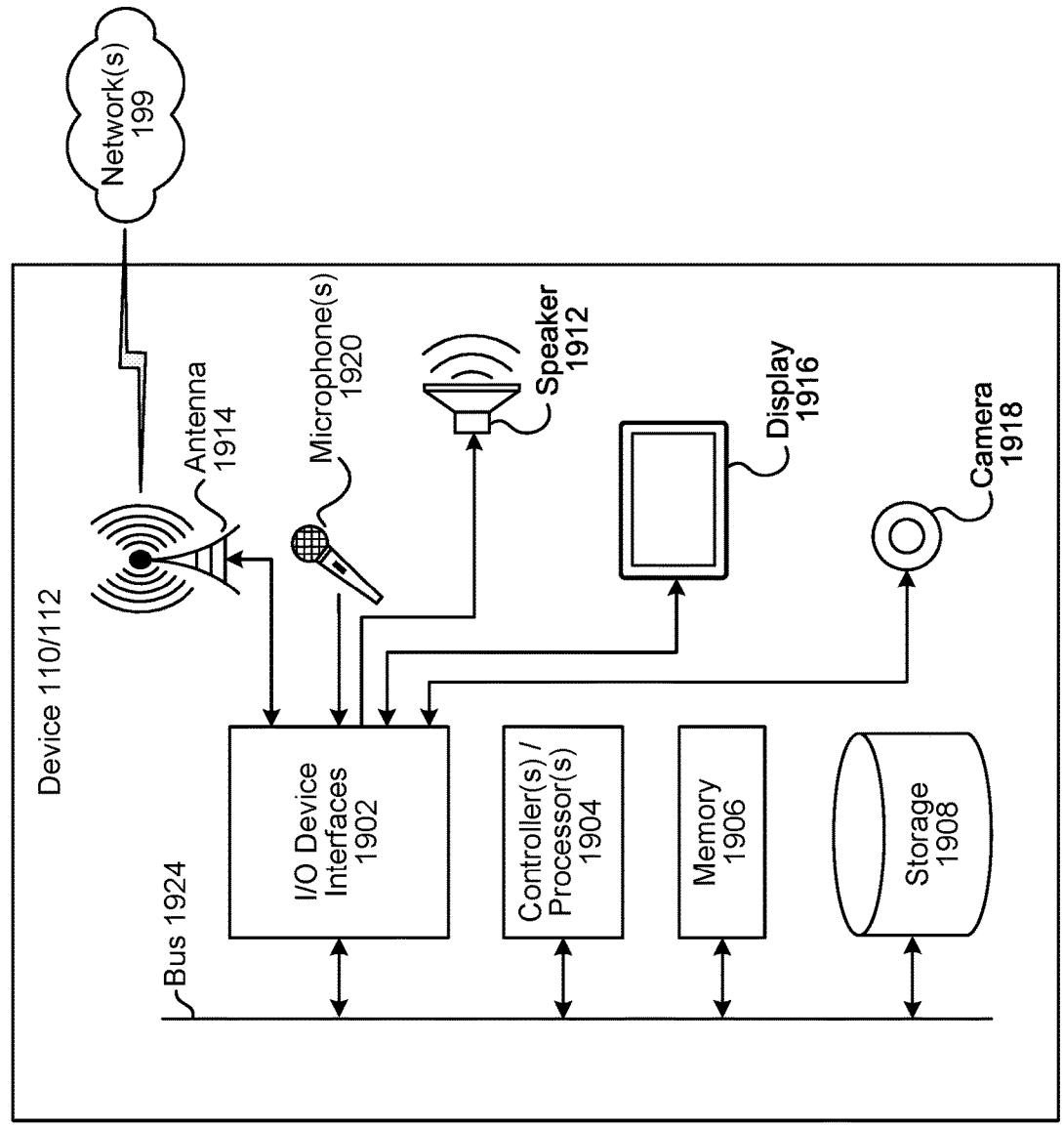
FIG. 19 is a block diagram conceptually illustrating example components of a device, in accordance with embodiments of the present disclosure.

FIG. 19 is a block diagram conceptually illustrating a device 110/112 that may be used with the system. FIG. 20 is a block diagram conceptually illustrating example components of a remote device, such as the system(s) 120, which may assist with ASR processing, NLU processing, etc., and the skill system(s) 1825. A system (120/1825) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/1825) may be included in the overall system of the present disclosure, such as one or more systems 120 for performing ASR processing, one or more systems 120 for performing NLU processing, one or more skill system(s) 1825, etc. In operation, each of these systems may include computer-readable and computer-executable instructions that reside on the respective device (120/1825), as will be discussed further below.

Each of these devices (110/112/120/1825) may include one or more controllers/processors (1904/2004), which may each include a central processing unit (CPU) for processing data and computer-readable instructions, and a memory (1906/2006) for storing data and instructions of the respective device. The memories (1906/2006) may individually include volatile random access memory (RAM), non-volatile read only memory (ROM), non-volatile magnetoresistive memory (MRAM), and/or other types of memory. Each device (110/112/120/1825) may also include a data storage component (1908/2008) for storing data and controller/processor-executable instructions. Each data storage component (1908/2008) may individually include one or more non-volatile storage types such as magnetic storage, optical storage, solid-state storage, etc. Each device (110/112/120/1825) may also be connected to removable or external non-volatile memory and/or storage (such as a removable memory card, memory key drive, networked storage, etc.) through respective input/output device interfaces (1902/2002).

Computer instructions for operating each device (110/112/120/1825) and its various components may be executed by the respective device's controller(s)/processor(s) (1904/2004), using the memory (1906/2006) as temporary "working" storage at runtime. A device's computer instructions may be stored in a non-transitory manner in non-volatile memory (1906/2006), storage (1908/2008), or an external device(s). Alternatively, some or all of the executable instructions may be embedded in hardware or firmware on the respective device in addition to or instead of software.

Each device (110/112/120/1825) includes input/output device interfaces (1902/2002). A variety of components may be connected through the input/output device interfaces (1902/2002), as will be discussed further below. Additionally, each device (110/112/120/1825) may include an address/data bus (1924/2024) for conveying data among components of the respective device. Each component within a device (110/112/120/1825) may also be directly connected to other components in addition to (or instead of) being connected to other components across the bus (1924/2024).

Referring to FIG. 19, the device 110/112 may include input/output device interfaces 1902 that connect to a variety of components such as an audio output component such as a speaker 1912, a wired headset or a wireless headset (not illustrated), or other component capable of outputting audio. The device 110/112 may also include an audio capture component. The audio capture component may be, for example, a microphone 1920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110/112 may additionally include a display 1916 for displaying content. The device 110/112 may further include a camera 1918.

Via antenna(s) 1914, the input/output device interfaces 1902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1902/2002) may also include communication components that allow data to be exchanged between devices such as different physical servers in a collection of servers or other components.

The components of the device(s) 110/112, the system(s) 120, or the skill system(s) 1825 may include their own dedicated processors, memory, and/or storage. Alternatively, one or more of the components of the device(s) 110/112, the system(s) 120, or the skill system(s) 1825 may utilize the I/O interfaces (1902/2002), processor(s) (1904/2004), memory (1906/2006), and/or storage (1908/2008) of the device(s) 110/112 system(s) 120, or the skill system(s) 1825, respectively. Thus, the ASR component 1850 may have its own I/O interface(s), processor(s), memory, and/or storage; the NLU component 1860 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110/112, the system(s) 120, and the skill system(s) 1825, as described herein, are illustrative, and may be located as a stand-alone device or may be included, in whole or in part, as a component of a larger device or system.

As illustrated in FIG. 21, multiple devices (110a-1101, 120, 1825) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, a toaster 110j, augmented reality (AR) glasses 110k, and/or headphones 1101 may be connected to the network(s) 199 through a wireless service provider, over a WiFi or cellular network connection, or the like. Other devices are included as network-connected support devices, such as the system(s) 120, the skill system(s) 1825, and/or others. The support devices may connect to the network(s) 199 through a wired connection or wireless connection.

Networked devices may capture audio using one-or-more built-in or connected microphones or other audio capture devices, with processing performed by ASR components, NLU components, or other components of the same device or another device connected via the network(s) 199, such as the ASR component 1850, the NLU component 1860, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    receiving, from a source device and by a system, first audio data representing a first utterance;
    determining first intent data corresponding to the first utterance;
    determining, using the first intent data, that a response to the first utterance is to present second audio data;
    determining a location associated with the source device;
    determining a list of devices associated with the location;
    determining a first output device represented in the list of devices, the first output device capable of presenting the second audio data;
    determining that the first output device is powered off;
    generating a request to power on the first output device;
    sending the request to the source device, wherein sending the request causes the source device to prompt a user to power on the first output device;
    determining, after sending the request, that the first output device is powered on; and
    sending, based at least in part on determining the first output device is powered on, the second audio data to the first output device.

2. The computer-implemented method of claim 1, further comprising:
    receiving, from the source device, third audio data representing a second utterance;
    determining second intent data corresponding to the second utterance;
    determining, using the second intent data, that a response to the second utterance is to present fourth audio data and video data;
    determining the first output device has at least one audio output component;
    determining a third output device represented in the list of devices, the third output device capable of presenting the fourth audio data and the video data;
    sending the fourth audio data to the first output device based at least in part on the first output device having the at least one audio output component; and
    sending the video data to the third output device.

3. The computer-implemented method of claim 1, further comprising:
    receiving, from the source device, third audio data representing a second utterance;
    determining second intent data corresponding to the second utterance;
    determining, using the second intent data, that a response to the second utterance is to present fourth audio data generated using text-to-speech (TTS) processing;
    determining that the first output device is incompatible for presenting audio generated using TTS processing;
    determining that a second output device is compatible for presenting audio generated using TTS processing, the second output device being represented in the list of devices; and
    sending the fourth audio data to the second output device instead of the first output device.

4. The computer-implemented method of claim 1, further comprising:

receiving, from the source device, third audio data representing a second utterance;
determining second intent data corresponding to the second utterance;
determining, using the second intent data, that a response to the second utterance is to present fourth audio data;
determining that the first output device is presenting first content;
determining that a second output device, represented in the list of devices, is presenting second content;
determining that the first output device received a first input at a first time;
determining that the second output device received a second input at a second time;
determining that the first time occurs after the second time; and
sending, based at least in part on the first time occurring after the second time, the fourth audio data to the first output device instead of the second output device.

5. A computer-implemented method comprising:
receiving, from a first device, a first user input corresponding to a first intent to receive a first output;
determining a second device capable of presenting the first output;
determining that the second device is powered off;
generating a request to power on the second device;
sending the request to the first device, wherein sending the request causes the first device to prompt a user to power on the second device;
determining, after sending the request, that the second device is powered on; and
sending, based at least in part on determining the second device is powered on, the first output to the second device.

6. The computer-implemented method of claim 5, further comprising:
receiving, from the first device, a second user input corresponding to a second intent to receive a second output;
determining, using the second intent, that the second output is to be presented as a visual output;
determining the second device is capable of presenting the visual output;
determining a third device capable of presenting the visual output;
determining that the second device received a first input at a first time;
determining that the third device received a second input at a second time;
determining that the first time occurs after the second time; and
sending the second output to the second device further based at least in part on determining that the first time occurs after the second time.

7. The computer-implemented method of claim 5, further comprising:
receiving, from the first device, a second user input corresponding to a second intent to receive a second output;
determining, using the second intent, that the second output is to be presented as a visual output;
determining that the second device is in a ready-state by:
determining that a display screen corresponding to the second device is on, and
determining that the display screen is displaying a home-screen; and
sending the second output to the second device further based at least in part on determining that the second device is in the ready-state.

8. The computer-implemented method of claim 5, further comprising:
determining that the first output comprises audio content;
determining that the first output comprises visual content corresponding to the audio content; and
sending the first output to the second device further based at least in part on the first output including the audio content and the visual content.

9. The computer-implemented method of claim 5, further comprising:
determining a third device capable of presenting the first output;
determining that the second device and the third device are both powered off; and
generating the request to power on at least one of the second device or the third device,
wherein sending the request causes the first device to prompt the user to power on at least one of the second device or the third device.

10. The computer-implemented method of claim 5, further comprising:
determining that the first user input explicitly requests the first output to be a visual output; and
generating the request based at least in part on determining that the first user input explicitly requests the first output be a visual output.

11. The computer-implemented method of claim 5, further comprising:
receiving, from the first device, a second user input corresponding to a second intent to receive a second output;
determining that the second device is presenting content; and
sending the second output to the second device, wherein sending the second output to the second device causes the second device to stop presenting the content.

12. The computer-implemented method of claim 5, further comprising:
receiving, from the first device, a second user input corresponding to a second intent to receive an audio output;
determining that neither of the second device nor a third device are assigned as a preferred device; and
sending the audio output to the second device and the third device.

13. A system comprising:
at least one processor; and
at least one memory including instructions that, when executed by the at least one processor, cause the system to:
receive, from a first device, a first user input corresponding to a first intent to receive a first output;
determine a second device capable of presenting the first output;
determine that the second device is powered off;
generate a request to power on the second device;
send the request to the first device, wherein sending the request causes the first device to prompt a user to power on the second device;
determine, after sending the request, that the second device is powered on; and
send, based at least in part on determining that the second device is powered on, the first output to the second device.

14. The system of claim 13, wherein the at least one memory further includes instructions that, when executed by the at least one processor, further cause the system to:
    receive, from the first device, a second user input corresponding to a second intent to receive a second output;
    determine, using the second intent, that the second output is to be presented as a visual output;
    determine the second device is capable of presenting the visual output;
    determine a third device capable of presenting the visual output;
    determine that the second device received a first input at a first time;
    determine that the third device received a second input at a second time;
    determine that the first time occurs after the second time; and
    send the second output to the second device further based at least in part on determining that the first time occurs after the second time.

15. The system of claim 13, wherein the at least one memory further includes instructions that, when executed by the at least one processor, further cause the system to:
    receive, from the first device, a second user input corresponding to a second intent to receive a second output;
    determine, using the second intent, that the second output is to be presented visually;
        determine that the second device is in a ready-state by causing the system to:
        determine that a display screen corresponding to the second device is on, and determine that the display screen is displaying a home-screen; and
    send the second output to the second device further based at least in part on determining that the second device is in the ready-state.

16. The system of claim 13, wherein the at least one memory further includes instructions that, when executed by the at least one processor, further cause the system to:
    determine that the first output comprises audio content;
    determine that the first output comprises visual content corresponding to the audio content; and
    send the first output to the second device further based at least in part on the first output including the audio content and the visual content.

17. The system of claim 13, wherein the at least one memory further includes instructions that, when executed by the at least one processor, further cause the system to:
    determine a third device capable of presenting the first output;
    determine that the second device and the third device are both powered off; and
    generate the request to power on at least one of the second device or the third device,
    wherein sending the request causes the first device to prompt the user to power on at least one of the second device or the third device.

18. The system of claim 13, wherein the at least one memory further includes instructions that, when executed by the at least one processor, further cause the system to:
    determine that the first user input explicitly requests the first output to be a visual output; and
    generate the request based at least in part on determining that the first user input explicitly requests the first output to be a visual output.

19. The system of claim 13, wherein the at least one memory further includes instructions that, when executed by the at least one processor, further cause the system to:
    receive, from the first device, a second user input corresponding to a second intent to receive a second output; and
    determine that the second device is presenting content,
    wherein the instructions that cause the system to send the second output to the second device further cause the second device to stop presenting the content.

20. The system of claim 13, wherein the at least one memory further includes instructions that, when executed by the at least one processor, further cause the system to:
    receive, from the first device, a second user input corresponding to a second intent to receive an audio output;
    determine that neither of the second device nor a third device are assigned as a preferred device; and
    send the audio output to the second device and the third device.

* * * * *